(12) United States Patent
Scholz et al.

(10) Patent No.: US 10,698,806 B1
(45) Date of Patent: Jun. 30, 2020

(54) COMBINATORIAL TESTING OF SOFTWARE FOR MULTI-LEVEL DATA STRUCTURES

(71) Applicant: SAP SE, Walldorf (DE)

(72) Inventors: Martin Scholz, Nussloch (DE); Tobias Poeppke, Oestringen (DE)

(73) Assignee: SAP SE, Walldorf (DE)

( * ) Notice: Subject to any disclaimer, the term of this patent is extended or adjusted under 35 U.S.C. 154(b) by 57 days.

(21) Appl. No.: 16/215,453

(22) Filed: Dec. 10, 2018

(51) Int. Cl.
*G06F 9/44* (2018.01)
*G06F 11/36* (2006.01)

(52) U.S. Cl.
CPC ...... *G06F 11/3688* (2013.01); *G06F 11/3676* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 7,469,255 B2 | 12/2008 | Kusterer et al. | |
| 7,739,249 B2 | 6/2010 | Haham et al. | |
| 9,875,288 B2 | 1/2018 | Bender | |
| 10,338,993 B1* | 7/2019 | Lekivetz | G06F 11/3688 |
| 10,509,717 B1* | 12/2019 | Surana | G06F 11/3664 |
| 2005/0268171 A1* | 12/2005 | House | G06F 11/2273 |
| | | | 714/32 |
| 2010/0275062 A1* | 10/2010 | Ur | G06F 11/263 |
| | | | 714/32 |
| 2012/0260132 A1* | 10/2012 | Blue | G06F 11/3676 |
| | | | 714/38.1 |
| 2013/0090911 A1* | 4/2013 | Segall | G06F 11/263 |
| | | | 703/21 |
| 2013/0091382 A1* | 4/2013 | Segall | G06F 11/3676 |
| | | | 714/32 |

(Continued)

OTHER PUBLICATIONS

Czerwonka, "Pairwise Testing—Available Tools," last updated Sep. 2018, http://www.pairwise.org/tools.asp, 2 pages, downloaded on Nov. 30, 2018.

(Continued)

*Primary Examiner* — Insun Kang
(74) *Attorney, Agent, or Firm* — Klarquist Sparkman, LLP

(57) ABSTRACT

Methods and apparatus are disclosed for efficient combinatorial testing of multi-level datatypes and data objects. A multi-level datatype associated with a software library has a plurality of linked levels with corresponding metadata attributes. A sparse set of metadata combinations is generated, providing full coverage of identified tuples of the metadata. Multi-level test datatypes are defined, with metadata attributes following the generated metadata combinations, and used to execute a test suite and validate the software library. A user interface of the software library can be tested and validated directly using the defined test datatypes. Alternatively, functions of the software library can be tested with test objects that are instances of the test datatypes. In variations, the software library can be tested for combinations of data values, or a mix of data and metadata. The software library can be a rules framework providing configuration and implementation of if-then rules for client applications.

18 Claims, 19 Drawing Sheets

(56) References Cited

U.S. PATENT DOCUMENTS

| | | | |
|---|---|---|---|
| 2014/0047278 A1* | 2/2014 | Sheye | G06F 11/3684 714/38.1 |
| 2014/0282434 A1* | 9/2014 | Eilam | G06F 11/3688 717/131 |
| 2014/0366005 A1* | 12/2014 | Kozhuharov | G06F 11/3696 717/125 |
| 2015/0007149 A1* | 1/2015 | Maddela | G06F 8/70 717/131 |
| 2015/0046906 A1* | 2/2015 | Segall | G06F 11/3676 717/124 |
| 2015/0286553 A1* | 10/2015 | Chien-Jen | G06F 11/3616 717/124 |
| 2015/0339213 A1* | 11/2015 | Lee | G06F 3/0484 717/125 |
| 2016/0019135 A1* | 1/2016 | Gotlieb | G06F 11/3684 717/124 |
| 2016/0103761 A1* | 4/2016 | Jain | G06F 11/3664 717/125 |
| 2016/0246838 A1* | 8/2016 | Li | G06F 16/2365 |
| 2016/0314062 A1* | 10/2016 | Pedro de Castro | G06F 11/3664 |
| 2017/0052877 A1* | 2/2017 | Ganda | G06F 11/3664 |
| 2017/0270034 A1* | 9/2017 | Cai | G06F 11/3664 |
| 2017/0308451 A1* | 10/2017 | Lange | G06F 11/3684 |
| 2018/0189170 A1* | 7/2018 | Dwarakanath | G06N 3/08 |
| 2019/0065009 A1* | 2/2019 | Savage | G06F 9/451 |
| 2019/0146755 A1* | 5/2019 | Mody | G06K 9/6292 708/200 |
| 2019/0155572 A1* | 5/2019 | Misra | G06F 11/263 |
| 2019/0163612 A1* | 5/2019 | Michalski | G06F 11/3664 |
| 2019/0171555 A1* | 6/2019 | Mody | G06F 16/24575 |
| 2019/0346297 A1* | 11/2019 | Lekivetz | G16C 20/70 |
| 2019/0370152 A1* | 12/2019 | Godefroid | G06F 11/3688 |

OTHER PUBLICATIONS

Heymann, "Combinatorial Test Design Methods," Oct. 30, 2013, https://archive.sap.com/documents/docs/DOC-48472, 2 pages, downloaded on Nov. 30, 2018.

Kuhn, et al. "Practical Combinatorial Testing," *National Institute of Standards and Technology, NIST Special Publication 800-142*, 82 pages, Oct. 2010.

"SAP Solution Manager 7.2 Test Suite," https://support.sap.com/content/dam/support/en_us/library/ssp/sap-solution-manager/processes-72/test-suite/test_suite_19.pdf, 68 pages, May 2018.

SAP, Technology I SuccessFactors https://www.successfactors.com/en_us/solutions/technology.html, 2 pages, downloaded Nov. 30, 2018.

\* cited by examiner

| Level | Datatype Name | Field Name | Subtype | Field Name | Subtype | Field Name | Subtype | Field Name | Subtype |
|---|---|---|---|---|---|---|---|---|---|
| 1 | Job Information | | | | | | | | |
| 2 | | Country | String | | | | | | |
| | | FTE | Boolean | | | | | | |
| | | Job Title | String | | | | | | |
| | | Department | tDepartment | | | | | | |
| 3 | | | | Name | String | | | | |
| | | | | Description | String | | | | |
| | | | | Cost Center | tCostCenter | | | | |
| 4 | | | | | | Name | String | | |
| | | | | | | Manager | tManager | | |
| 5 | | | | | | | | ... | ... |

Level 1 (Root) Field / Root Subtype / Level 2 Field / Level 2 Subtype

| | L1F | Mv | Cr | Ro | Im | Rq | L1T | Ls | Dt | En | L2F | Mv | Cr | Ro | Im | Rq | Vs | L2T | Rt | Ls | Dt | En |
|---|---|---|---|---|---|---|---|---|---|---|---|---|---|---|---|---|---|---|---|---|---|---|
| Row 3 | L1F_LsRq | F | F | F | F | T | L1T_Ls | T | F | F | L2F_RtLsDtEnCrRoImRqVs | F | T | T | T | T | T | T | L2T_RtLsDtEn | T | T | T | T |
| 4 | L1F_DtEnMvCrRoIm | T | T | T | T | F | L1T_DtEn | F | T | T | L2F_EnMv | T | F | F | F | F | F | L2T_En | F | F | F | T |
| 5 | L1F_LsDtMvRo | T | F | T | F | F | L1T_LsDt | T | T | F | L2F_LsImVs | F | F | F | T | F | T | L2T_Ls | F | T | F | F |
| 6 | L1F_EnCrImRq | F | T | F | T | T | L1T_En | F | F | T | L2F_RtDtMvCrRoRq | T | T | T | F | T | F | L2T_RtDt | T | F | T | F |
| 7 | L1F_LsDtMvCrRoImRq | T | T | T | T | T | L1T_LsDt | T | T | F | L2F_LsDtMvCrRoVs | T | T | T | F | F | T | L2T_LsDt | F | T | T | F |
| 8 | L1F_En | F | F | F | F | F | L1T_En | F | F | T | L2F_RtMvImRq | T | F | F | T | T | F | L2T_Rt | T | F | F | F |
| 9 | L1F_LsEnMvRoIm | T | F | T | T | F | L1T_LsEn | T | F | T | L2F_RtLsRo | F | F | T | F | F | F | L2T_RtLs | T | T | F | F |
| 10 | L1F_DtCr | F | T | F | F | F | L1T_Dt | F | T | F | L2F_DtEnCrRqVs | F | T | F | F | T | T | L2T_DtEn | F | F | T | T |
| 11 | L1F_LsEnMvCrImRq | T | T | F | T | T | L1T_LsEn | T | F | T | L2F_RtDtMvRoImVs | T | F | T | T | F | T | L2T_RtDt | T | F | T | F |
| 12 | L1F_RoRq | F | F | T | F | T | L1T | F | F | F | L2F_LsEnImRq | F | F | F | T | T | F | L2T_LsEn | F | T | F | T |
| 13 | L1F_DtEnMvCrRoRq | T | T | T | F | T | L1T_DtEn | F | T | T | L2F_RtLsCrImRq | F | T | F | T | T | F | L2T_RtLs | T | T | F | F |
| Row 14 | L1F_LsDtImRq | F | F | F | T | T | L1T_LsDt | T | T | F | L2F_DtIm | F | F | F | T | F | F | L2T_Dt | F | F | T | F |

Level 3 Field / Level 3 Subtype / Level 4 Field / Level 4 Subtype

| | L3F | Mv | Cr | Ro | Im | Rq | Vs | L3T | Rt | Ls | Dt | En | L4F | Ro | Rq | Vs | L4T | Rt |
|---|---|---|---|---|---|---|---|---|---|---|---|---|---|---|---|---|---|---|
| Row 3 | L3F_RtLsEnMvCrRoImVs | T | T | T | T | F | T | L3T_RtLsEn | T | T | F | T | L4F_Ro | T | F | F | L4T | F |
| 4 | L3F_DtRq | F | F | F | F | T | F | L3T_Dt | F | F | T | F | L4F_RtRqVs | F | T | T | L4T_Rt | T |
| 5 | L3F_LsDtMvRoImRqVs | T | F | T | T | T | T | L3T_LsDt | F | T | T | F | L4F_RoRqVs | T | T | T | L4T | F |
| 6 | L3F_DtEnCrRo | F | T | T | F | F | F | L3T_DtEn | F | F | T | T | L4F_Rt | F | F | F | L4T_Rt | T |
| 7 | L3F_RtMvCrRq | T | T | F | F | T | F | L3T_Rt | T | F | F | F | L4F_RtRoVs | T | F | T | L4T_Rt | T |
| 8 | L3F_RtLsEnRqVs | F | F | F | F | T | T | L3T_RtLsEn | T | T | F | T | L4F_Rq | F | T | F | L4T | F |
| 9 | L3F_RtLsDtEnCrIm | F | T | F | T | F | F | L3T_RtLsDtEn | T | T | T | T | L4F_RtRqVs | F | T | T | L4T_Rt | T |
| 10 | L3F_RoImVs | F | F | T | T | F | T | L3T | F | F | F | F | L4F_Ro | T | F | F | L4T | F |
| 11 | L3F_DtMvImRqVs | T | F | F | T | T | T | L3T_Dt | F | F | T | F | L4F_RtRq | F | T | F | L4T_Rt | T |
| 12 | L3F_DtEnMvCrRo | T | T | T | F | F | F | L3T_DtEn | F | F | T | T | L4F_RoVs | T | F | T | L4T | F |
| 13 | L3F_LsEnMvCrRo | T | T | T | F | F | F | L3T_LsEn | F | T | F | T | L4F_RtRoRq | T | T | F | L4T_Rt | T |
| Row 14 | L3F_RtLsEnCrRoRqVs | F | T | F | F | T | T | L3T_RtLsEn | T | T | F | T | L4F_RqVs | F | T | T | L4T | F |

*FIG. 7B*

| | Level 1 | |
|---|---|---|
| | Field | Subtype |
| Row 3 | L1F_LsRq | L1T_Ls |
| 4 | L1F_DtEnMvCrRoIm | L1T_DtEn |
| 5 | L1F_LsDtMvRo | L1T_LsDt |
| 6 | L1F_EnCrImRq | L1T_En |
| 7 | L1F_LsDtMvCrRoImRq | L1T_LsDt |
| 8 | L1F_En | L1T_En |
| 9 | L1F_LsEnMvRoIm | L1T_LsEn |
| 10 | L1F_DtCr | L1T_Dt |
| 11 | L1F_LsEnMvCrImRq | L1T_LsEn |
| 12 | L1F_RoRq | L1T_ |
| 13 | L1F_DtEnMvCrRoRq | L1T_DtEn |
| Row 14 | L1F_LsDtImRq | L1T_LsDt |

| | Level 4 | |
|---|---|---|
| | Field | Subtype |
| Row 3 | L4F_Ro | L4T_ |
| 4 | L4F_RqVs | L4T_Rt |
| 5 | L4F_RoRqVs | L4T_ |
| 6 | L4F_ | L4T_Rt |
| 7 | L4F_RoVs | L4T_Rt |
| 8 | L4F_Rq | L4T_ |
| 9 | L4F_RqVs | L4T_Rt |
| 10 | L4F_Ro | L4T_ |
| 11 | L4F_Rq | L4T_Rt |
| 12 | L4F_RoVs | L4T_ |
| 13 | L4F_RoRq | L4T_Rt |
| Row 14 | L4F_RqVs | L4T_ |

| | Level 2 | |
|---|---|---|
| | Field | Subtype |
| Row 3 | L2F_RtLsDtEnCrRoImRqVs | L2T_RtLsDtEn |
| 4 | L2F_EnMv | L2T_En |
| 5 | L2F_LsImVs | L2T_Ls |
| 6 | L2F_RtDtMvCrRoRq | L2T_RtDt |
| 7 | L2F_LsDtMvCrRoVs | L2T_LsDt |
| 8 | L2F_RtMvImRq | L2T_Rt |
| 9 | L2F_RtLsRo | L2T_RtLs |
| 10 | L2F_DtEnCrRqVs | L2T_DtEn |
| 11 | L2F_RtDtMvRoImVs | L2T_RtDt |
| 12 | L2F_LsEnImRq | L2T_LsEn |
| 13 | L2F_RtLsCrImRq | L2T_RtLs |
| Row 14 | L2F_DtIm | L2T_Dt |

| | Level 3 | |
|---|---|---|
| | Field | Subtype |
| Row 3 | L3F_RtLsEnMvCrRoImVs | L3T_RtLsEn |
| 4 | L3F_DtRq | L3T_Dt |
| 5 | L3F_LsDtMvRoImRqVs | L3T_LsDt |
| 6 | L3F_DtEnCrRo | L3T_DtEn |
| 7 | L3F_RtMvCrRq | L3T_Rt |
| 8 | L3F_RtLsEnRqVs | L3T_RtLsEn |
| 9 | L3F_RtLsDtEnCrIm | L3T_RtLsDtEn |
| 10 | L3F_RoImVs | L3T_ |
| 11 | L3F_DtMvImRqVs | L3T_Dt |
| 12 | L3F_DtEnMvCrRo | L3T_DtEn |
| 13 | L3F_LsEnMvCrRo | L3T_LsEn |
| Row 14 | L3F_RtLsEnCrRoRqVs | L3T_RtLsEn |

FIG. 7C

| | Parent Subtype | Field | Child Subtype |
|---|---|---|---|
| | Level 1 | Level 2 | Level 2 |
| Row 3 | L1T_Ls | L2F_RtLsDtEnCrRoImRqVs | L2T_RtLsDtEn |
| 4 | L1T_DtEn | L2F_EnMv | L2T_En |
| 5 | L1T_LsDt | L2F_LsImVs | L2T_Ls |
| 6 | L1T_En | L2F_RtDtMvCrRoRq | L2T_RtDt |
| 7 | L1T_LsDt | L2F_LsDtMvCrRoVs | L2T_LsDt |
| 8 | L1T_En | L2F_RtMvImRq | L2T_Rt |
| 9 | L1T_LsEn | L2F_RtLsRo | L2T_RtLs |
| 10 | L1T_Dt | L2F_DtEnCrRqVs | L2T_DtEn |
| 11 | L1T_LsEn | L2F_RtDtMvRoImVs | L2T_RtDt |
| 12 | L1T_ | L2F_LsEnImRq | L2T_LsEn |
| 13 | L1T_DtEn | L2F_RtLsCrImRq | L2T_RtLs |
| Row 14 | L1T_LsDt | L2F_DtIm | L2T_Dt |

| | Level 2 | Level 3 | Level 3 |
|---|---|---|---|
| Row 3 | L2T_RtLsDtEn | L3F_RtLsEnMvCrRoImVs | L3T_RtLsEn |
| 4 | L2T_En | L3F_DtRq | L3T_Dt |
| 5 | L2T_Ls | L3F_LsDtMvRoImRqVs | L3T_LsDt |
| 6 | L2T_RtDt | L3F_DtEnCrRo | L3T_DtEn |
| 7 | L2T_LsDt | L3F_RtMvCrRq | L3T_Rt |
| 8 | L2T_Rt | L3F_RtLsEnRqVs | L3T_RtLsEn |
| 9 | L2T_RtLs | L3F_RtLsDtEnCrIm | L3T_RtLsDtEn |
| 10 | L2T_DtEn | L3F_RoImVs | L3T_ |
| 11 | L2T_RtDt | L3F_DtMvImRqVs | L3T_Dt |
| 12 | L2T_LsEn | L3F_DtEnMvCrRo | L3T_DtEn |
| 13 | L2T_RtLs | L3F_LsEnMvCrRo | L3T_LsEn |
| Row 14 | L2T_Dt | L3F_RtLsEnCrRoRqVs | L3T_RtLsEn |

| | Level 3 | Level 4 | Level 4 |
|---|---|---|---|
| Row 3 | L3T_RtLsEn | L4F_Ro | L4T_ |
| 4 | L3T_Dt | L4F_RqVs | L4T_Rt |
| 5 | L3T_LsDt | L4F_RoRqVs | L4T_ |
| 6 | L3T_DtEn | L4F_ | L4T_Rt |
| 7 | L3T_Rt | L4F_RoVs | L4T_Rt |
| 8 | L3T_RtLsEn | L4F_Rq | L4T_ |
| 9 | L3T_RtLsDtEn | L4F_RqVs | L4T_Rt |
| 10 | L3T_ | L4F_Ro | L4T_ |
| 11 | L3T_Dt | L4F_Rq | L4T_Rt |
| 12 | L3T_DtEn | L4F_RoVs | L4T_ |
| 13 | L3T_LsEn | L4F_RoRq | L4T_Rt |
| Row 14 | L3T_RtLsEn | L4F_RqVs | L4T_ |

| | Parent Subtype |
|---|---|
| | Level 4 |
| Row 3 | L4T_ |
| 4 | L4T_Rt |
| 5 | L4T_ |
| 6 | L4T_Rt |
| 7 | L4T_Rt |
| 8 | L4T_ |
| 9 | L4T_Rt |
| 10 | L4T_ |
| 11 | L4T_Rt |
| 12 | L4T_ |
| 13 | L4T_Rt |
| Row 14 | L4T_ |

FIG. 7D

| | Parent Subtype | Field | Child Subtype |
|---|---|---|---|
| | Level 1 | Level 2 | Level 2 |
| Row 12 | L1T_ | L2F_LsEnImRq | L2T_LsEn |
| 10 | L1T_Dt | L2F_DtEnCrRqVs | L2T_DtEn |
| 4 | L1T_DtEn | L2F_EnMv | L2T_En |
| 13 | L1T_DtEn ■ | L2F_RtLsCrImRq | L2T_RtLs |
| 6 | L1T_En | L2F_RtDtMvCrRoRq | L2T_RtDt |
| 8 | L1T_En ■ | L2F_RtMvImRq | L2T_Rt |
| 3 | L1T_Ls | L2F_RtLsDtEnCrRoImRqVs | L2T_RtLsDtEn |
| 5 | L1T_LsDt | L2F_LsImVs | L2T_Ls |
| 7 | L1T_LsDt ■ | L2F_LsDtMvCrRoVs | L2T_LsDt |
| 14 | L1T_LsDt ■ | L2F_DtIm | L2T_Dt |
| 9 | L1T_LsEn | L2F_RtLsRo | L2T_RtLs |
| Row 11 | L1T_LsEn ■ | L2F_RtDtMvRoImVs | L2T_RtDt |

| | Level 2 | Level 3 | Level 3 |
|---|---|---|---|
| Row 14 | L2T_Dt | L3F_RtLsEnCrRoRqVs | L3T_RtLsEn |
| 10 | L2T_DtEn | L3F_RoImVs | L3T_ |
| 4 | L2T_En | L3F_DtRq | L3T_Dt |
| 5 | L2T_Ls | L3F_LsDtMvRoImRqVs | L3T_LsDt |
| 7 | L2T_LsDt | L3F_RtMvCrRq | L3T_Rt |
| 12 | L2T_LsEn | L3F_DtEnMvCrRo | L3T_DtEn |
| 8 | L2T_Rt | L3F_RtLsEnRqVs | L3T_RtLsEn |
| 6 | L2T_RtDt | L3F_DtEnCrRo | L3T_DtEn |
| 11 | L2T_RtDt ■ | L3F_DtMvImRqVs | L3T_Dt |
| 9 | L2T_RtLs | L3F_RtLsDtEnCrIm | L3T_RtLsDtEn |
| 13 | L2T_RtLs ■ | L3F_LsEnMvCrRo | L3T_LsEn |
| Row 3 | L2T_RtLsDtEn | L3F_RtLsEnMvCrRoImVs | L3T_RtLsEn |

| | Level 3 | Level 4 | Level 4 | | Parent Subtype | |
|---|---|---|---|---|---|---|
| | | | | | Level 4 | |
| Row 10 | L3T_ | L4F_Ro | L4T_ | Row 3 | L4T_ | |
| 4 | L3T_Dt | L4F_RqVs | L4T_Rt | 5 | L4T_ | ■ |
| 11 | L3T_Dt ■ | L4F_Rq | L4T_Rt | 8 | L4T_ | ■ |
| 6 | L3T_DtEn | L4F_ | L4T_Rt | 10 | L4T_ | ■ |
| 12 | L3T_DtEn ■ | L4F_RoVs | L4T_ | 12 | L4T_ | ■ |
| 5 | L3T_LsDt | L4F_RoRqVs | L4T_ | 14 | L4T_ | ■ |
| 13 | L3T_LsEn | L4F_RoRq | L4T_Rt | 4 | L4T_Rt | |
| 7 | L3T_Rt | L4F_RoVs | L4T_Rt | 6 | L4T_Rt | ■ |
| 9 | L3T_RtLsDtEn | L4F_RqVs | L4T_Rt | 7 | L4T_Rt | ■ |
| 3 | L3T_RtLsEn | L4F_Ro | L4T_ | 9 | L4T_Rt | ■ |
| 8 | L3T_RtLsEn ■ | L4F_Rq | L4T_ | 11 | L4T_Rt | ■ |
| Row 14 | L3T_RtLsEn ■ | L4F_RqVs | L4T_ | Row 13 | L4T_Rt | ■ |

■ DUPLICATE PARENT SUBTYPE

*FIG. 7E*

|  | Parent Subtype | Field | Child Subtype |
|---|---|---|---|
|  | Level 1 | Level 2 | Level 2 |
| Row 12 | L1T_ | L2F_LsEnImRq | L2T_LsEn |
| 10 | L1T_Dt | L2F_DtEnCrRqVs | L2T_DtEn |
| 4 | L1T_DtEn | L2F_EnMv | L2T_En |
|  |  | L2F_RtLsCrImRq | L2T_RtLs |
| 6 | L1T_En | L2F_RtDtMvCrRoRq | L2T_RtDt |
|  |  | L2F_RtMvImRq | L2T_Rt |
| 3 | L1T_Ls | L2F_RtLsDtEnCrRoImRqVs | L2T_RtLsDtEn |
| 5 | L1T_LsDt | L2F_LsImVs | L2T_Ls |
|  |  | L2F_LsDtMvCrRoVs | L2T_LsDt |
|  |  | L2F_DtIm | L2T_Dt |
| 9 | L1T_LsEn | L2F_RtLsRo | L2T_RtLs |
|  |  | L2F_RtDtMvRoImVs | L2T_RtDt |

|  | Level 2 | Level 3 | Level 3 |
|---|---|---|---|
| Row 14 | L2T_Dt | L3F_RtLsEnCrRoRqVs | L3T_RtLsEn |
| 10 | L2T_DtEn | L3F_RoImVs | L3T_ |
| 4 | L2T_En | L3F_DtRq | L3T_Dt |
| 5 | L2T_Ls | L3F_LsDtMvRoImRqVs | L3T_LsDt |
| 7 | L2T_LsDt | L3F_RtMvCrRq | L3T_Rt |
| 12 | L2T_LsEn | L3F_DtEnMvCrRo | L3T_DtEn |
| 8 | L2T_Rt | L3F_RtLsEnRqVs | L3T_RtLsEn |
| 6 | L2T_RtDt | L3F_DtEnCrRo | L3T_DtEn |
|  |  | L3F_DtMvImRqVs | L3T_Dt |
| 9 | L2T_RtLs | L3F_RtLsDtEnCrIm | L3T_RtLsDtEn |
|  |  | L3F_LsEnMvCrRo | L3T_LsEn |
| Row 3 | L2T_RtLsDtEn | L3F_RtLsEnMvCrRoImVs | L3T_RtLsEn |

|  | Level 3 | Level 4 | Level 4 |
|---|---|---|---|
| Row 10 | L3T_ | L4F_Ro | L4T_ |
| 4 | L3T_Dt | L4F_RqVs | L4T_Rt |
|  |  | L4F_Rq | L4T_Rt |
| 6 | L3T_DtEn | L4F_ | L4T_Rt |
|  |  | L4F_RoVs | L4T_ |
| 5 | L3T_LsDt | L4F_RoRqVs | L4T_ |
| 13 | L3T_LsEn | L4F_RoRq | L4T_Rt |
| 7 | L3T_Rt | L4F_RoVs | L4T_Rt |
| 9 | L3T_RtLsDtEn | L4F_RqVs | L4T_Rt |
| 3 | L3T_RtLsEn | L4F_Ro | L4T_ |
|  |  | L4F_Rq | L4T_ |
|  |  | L4F_RqVs | L4T_ |

|  | Parent Subtype |
|---|---|
|  | Level 4 |
| Row 3 | L4T_ |
| Row 4 | L4T_Rt |

*FIG. 7F*

```
[
  {
    "id": "L1T_LsDt",         ←781
    "Rt": true,
    "Ls": true,
    "Dt": true,
    "En": false, "fields": [
      {
        "name": "L2F_LsImVs",       ←782
        "typeName": "L2T_Ls",       ←783
        "Mv": false,
        "Cr": false,
        "Ro": false,
        "Im": true,
        "Rq": false,
        "Vs": true
      },
      {
        "name": "L2F_LsDtMvCrRoVs", ←784
        "typeName": "L2T_LsDt",       ←785
        "Mv": true,
        "Cr": true,
        "Ro": true,
        "Im": false,
        "Rq": false,
        "Vs": true
      },
      {
        "name": "L2F_DtIm",         ←786
        "typeName": "L2T_Dt",       ←787
        "Mv": false,
        "Cr": false,
        "Ro": false,
        "Im": true,
        "Rq": false,
        "Vs": false
      }
    ]
  }
]
```

COMBINATORIAL TESTING OF SOFTWARE FOR MULTI-LEVEL DATA STRUCTURES

BACKGROUND

Software architectures are increasingly using products such as libraries, frameworks, and reusable packages. Many such software products are designed to operate with hierarchically organized data, which can be quite complex. Additionally, such products can be deployed across multiple applications and integrated into customized applications, for which the hierarchical data structures can vary according to the application need. Accordingly, it is important to test such software products for the wide range of data structures that could be encountered over the product's lifetime. For hierarchical data structures of even moderate complexity, the number of variations can be prohibitive for exhaustive testing; in some cases, the number of variations can even be infinite. Moreover, known combinatorial testing approaches are not suited for handling hierarchical or multi-level datatypes.

Accordingly, there remains a need for improved technology for validating software products for multi-level or hierarchical datatypes.

SUMMARY

In certain examples, the disclosed technologies can be implemented as a method of testing a software library for multi-level datatypes. Multi-level datatypes have multiple linked levels with corresponding metadata attributes. A set of tuples of the corresponding metadata attributes is determined, either by selection at runtime or by receiving a predetermined specification of the tuples. The method generates a sparse set of metadata combinations providing full coverage of the set of tuples. Multi-level test datatypes are defined with metadata attributes set according to the generated metadata combinations. The software library is validated by executing a test suite, which is based at least in part on the multi-level test datatypes, for the software library.

In some examples, at least one of the metadata attributes can be a binary attribute, while in other examples, at least one of the metadata attributes can have three or more possible values. In some examples, at least one of the tuples can be a pair, while in other examples, at least one of the tuples can be an N-tuple for $N \geq 3$, incorporating N of the corresponding metadata attributes. The multi-level datatypes can define data structures of a software application, which can include a rules framework with a calling interface accessible to the application's users. The software library can include a user interface and executing the test suite can include verifying menus or selections of the user interface for one or more of the multi-level test datatypes.

In additional examples, a given datatype of the multi-level datatypes can have a plurality of subtypes at respective levels, and at least a given one of the subtypes can have one or more type metadata attributes. The type metadata attributes can include one or more of: an attribute indicating whether the given subtype can occur at a root level of a corresponding datatype; an attribute indicating whether a list of possible data values can be formed for the given subtype; an attribute indicating whether the given subtype can have time slices; an attribute indicating whether the given subtype is accessible to one or more functions of the software library; or an attribute indicating whether the given subtype has fields.

In further examples, a given datatype of the multi-level datatypes can have a plurality of subtypes at respective levels, and at least a given one of the subtypes can have a field with one or more field metadata attributes. The field metadata attributes can include one or more of: an attribute indicating whether the field can have multiple values; an attribute indicating whether a data value of the field can be modified; an attribute indicating whether the field is mutable; an attribute indicating whether the data value for the field must be defined; or an attribute indicating whether the field can be accessed by one or more functions of the software library.

In some additional examples, the set of tuples can exclude one or more constant attributes of the corresponding metadata attributes, and the constant attributes can be set while defining the multi-level test datatypes. Defining multi-level test datatypes can include identifying a given subtype among the metadata combinations that has redundant combinations of type metadata attributes, and merging respective subtrees of the redundant combinations into a multi-valued field of the given subtype. Alternatively or additionally, defining multi-level test datatypes can include promoting, to a root level, a given subtype that can occur at a level below the root level in another multi-level test datatype. Validating can include building respective instances of the multi-level test datatypes, and verifying operation of one or more functions of the software library acting on these instances.

In certain examples, the disclosed technologies can be implemented as computer-readable media storing computer-executable instructions causing one or more hardware processors to perform certain operations. Multi-level datatypes have metadata attributes. A set of tuples of these attributes is determined. The operations generate a sparse set of metadata combinations providing full coverage of the set of tuples. Multi-level test datatypes are defined with metadata attributes set according to the generated metadata combinations. The software library is validated by executing a test suite, based at least in part on the multi-level test datatypes, for the software library.

In some examples, the software library can include a rules framework accessible to a software application, and the multi-level datatypes define data structures of the software application. The software library can include a user interface, and executing the test suite can include comparing output of the user interface with target output for one or more of the multi-level test datatypes. A multi-level datatype can include a hierarchy of subtypes at respective levels, with each subtype below a root level occupying a field of a parent subtype of the subtypes.

In certain examples, the disclosed technologies can be implemented as a method in which a function of a validated software library is called, wherein the software library is operable on multi-level datatypes having a plurality of linked levels with corresponding metadata attributes. The software library has been validated by determining a set of tuples of the metadata attributes, generating a sparse set of metadata combinations providing full coverage of the set of tuples of the metadata attributes, defining multi-level test datatypes whose metadata attributes are set according to the generated metadata combinations, and executing a test suite for the software library, based at least in part on the multi-level test datatypes. In some examples, the function call can cause a rule to be configured, the rule pertaining to a client application of the validated software library.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIG. 1 is an illustration of a first example of a hierarchical datatype.

FIGS. 7A-7H illustrate example data according to a fourth example method.

DETAILED DESCRIPTION

Overview

Figure 2:
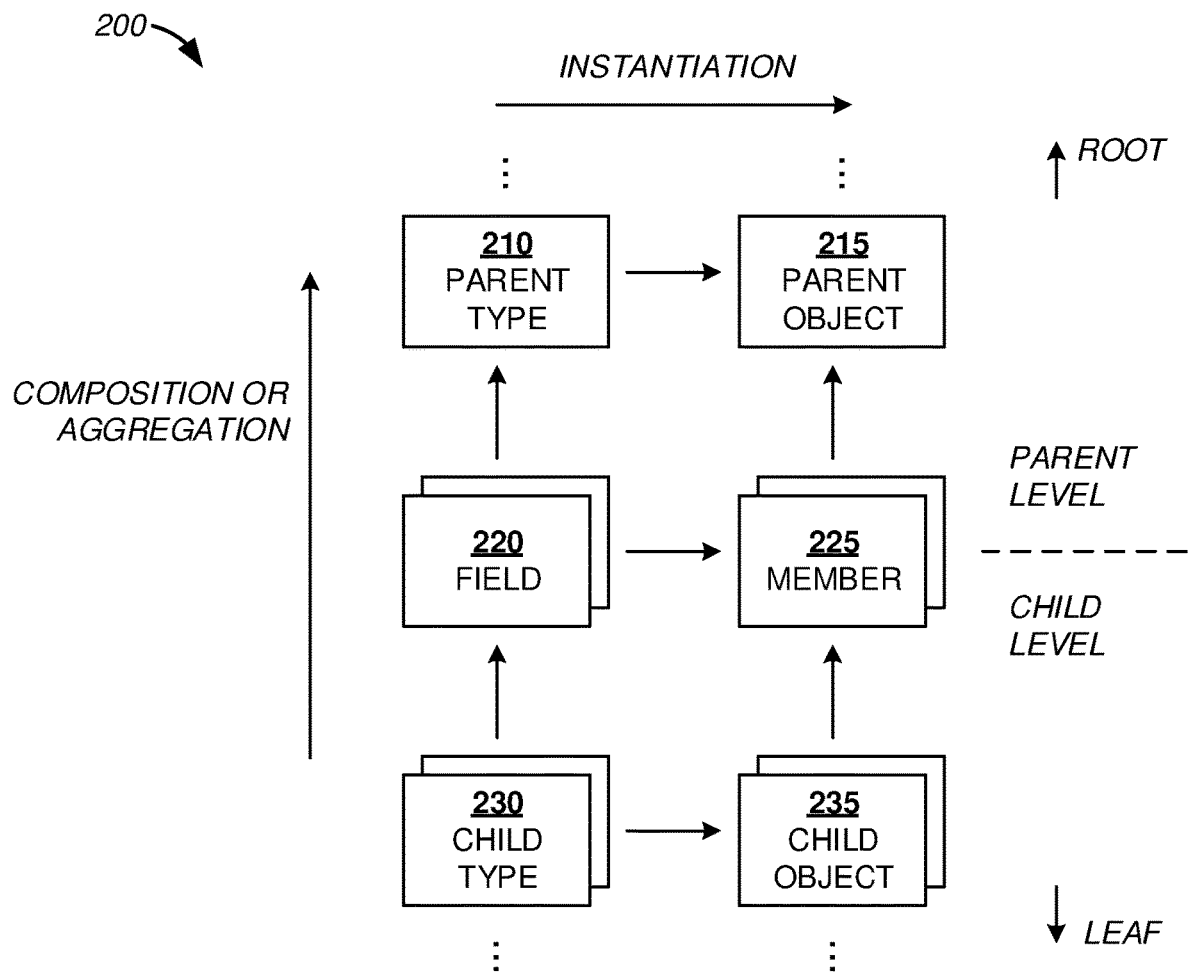
FIG. 2 is a block diagram illustrating relationships between several software terms used in this disclosure.

The disclosed technologies provide methods and systems for efficient validation of software libraries for multi-level datatypes or objects.

FIG. 1 is an illustration 100 of a simple hierarchical datatype belonging to an application and called "Job Information". This datatype has four direct fields, Country, FTE, Job Title, and Department. The first three of these are simple or primitive datatypes, for example, a data value for the Country field could be the string "Germany", a data value for the FTE fields could be Boolean True, and a data value for the Job Title field could be the string "engineer". However, the Department field can itself hold a complex datatype (e.g., a struct or class in C++) which can be hierarchical. The datatype held by the Department field can be called tDepartment, to distinguish from the field name. In this example, the tDepartment datatype can have fields of primitive type (Name, holding a string, and Description, also holding a string), and can also have a field Cost Center holding a complex datatype called tCostCenter. In turn, the tCostCenter datatype can hold a primitive datatype (a string) in a Name field and a complex datatype tManager in a Manager field. Thus, the Job Information datatype is a hierarchical datatype spanning at least five levels: the root level Job Information, then three successive levels for tDepartment, tCostCenter, and tManager, and finally the leaf level of the Manager datatype's fields.

To provide the functionality of Job Information, the application can interface with subordinate software products that can variously be termed libraries, frameworks, packages, and the like. In addition to working with one particular implementation of the Job Information datatype, it is desirable that the libraries be operable with variations and customizations according to varying deployments of the application, or for other similar applications. For example, a first application deployment could have the Country field as a constant (all jobs are located in "USA"), while in a second deployment Country can be selectable from a list (jobs must be in "Germany", "Bulgaria", or "Korea"), and a third deployment can have a free text field for Country. Thus, in different deployments, the metadata for the Country field can variously be constant=True, constant=False, list-selectable=True, list-selectable=False. Thus, proper behavior of a user interface can vary between not showing any options for Country, offering a drop-down selectable list, or offering a free form text input box. This simple example pertains to two metadata fields for a single field.

It can be desirable to test a software library for all different metadata combinations. However, even in a modest size example like Job Information there could be several tens of metadata parameters. Thirty binary parameters correspond to a total of $2^{30}$ possible metadata configurations, which is over a billion. It is apparent that exhaustive testing of all possible combinations can be prohibitively expensive (in time or resources) for all but the simplest cases.

Combinatorial testing can dramatically alleviate the testing effort required. All-pairs testing involves generation of enough test cases that, for every pair of parameters, all combinations occur at least once among the test cases. For two Boolean parameters, that means True-True, True-False, False-True, and False-False occur at least once each within the test cases. With three binary parameters, there are $2^3=8$ combinations in all, but pair-wise coverage can be obtained with just four combinations (for example, TTT, TFF, FTF, FFT). 35 binary parameters have approximately 34 billion combinations, however full pair-wise coverage can be obtained with just 12 combinations.

In some situations, it can be desirable to test some or all 3-way combinations instead of just pairwise testing. In some situations, parameters can have more than just binary values. Although the number of test cases required in such situations can be greater than the examples above, dramatic savings can still be obtained. A principle of combinatorial testing is that a large fraction of software bugs can be detected by exhaustive testing of attribute tuples without requiring exhaustive testing of the entire space of possible attribute values.

Whether pairs, triples, or other tuples are used, the disclosed technologies enable practical and efficient full coverage tuple-wise testing for sizeable multi-level data structures encountered in many applications. Multi-level data structures having at least 10, 30, 100, 300, 1000, or even more attributes can be efficiently tested across a wide range of use cases without needing to reconfigure and re-test each time a new application changes one or more of the attributes. In some examples, even addition of new fields and subtypes to a multi-level data structure need not require new testing, if all relevant attribute tuples have already been tested.

Conventionally, each time a multi-level data structure associated with a software library is repurposed, and some attribute of the data structure is changed, test data structures are rebuilt and new tests are run. That is, a single case-specific set of tests is run each time, and has limited validity. The limited validity is a technical problem, which necessitates revisiting a testing phase of development and requires re-test when changes are made. This technical problem is solved by the disclosed technologies, whereby comprehensive tests can be developed and run once over an extended lifetime of a software library. The software library can include, for example, a user interface or other functions.

The use of combinatorial testing for multi-level or hierarchical datatypes raises considerations beyond those involved in flat arrays or parameters, for example, (a) the role and relationship between datatypes and fields, (b) handling lower-level datatypes that can also stand on their own as root level datatypes (e.g., tDepartment or tCostCenter in the example of FIG. 1), or (c) handling a datatype admitting multiple copies of a particular field. The levels of a multi-level datatype can also be used to limit testing complexity: test datatypes and test data objects can be limited to a fixed maximum number of levels, such as four, even if actual data objects used by a software library have a greater number of levels. The examples described below discuss handling of these and other aspects for multi-level datatypes and data objects.

FIG. 2 is a block diagram 200 illustrating relationships among datatypes and data objects as used in this disclosure. Multi-level datatypes and data objects can be formed of smaller subtypes and smaller objects at progressively lower levels, for example, by composition or aggregation. Block 210 represents a parent level datatype or class having one or more fields 220, each of which has a particular role within the parent level datatype 210. Each field 220 can be occupied by a respective child subtype 230. As an example, the Job Information datatype of FIG. 2 has fields for Country and Job Title. Each of these fields can hold a string subtype, but the meaning of this string is dependent on which field the string occupies. Both the field and its associated child subtype can have associated metadata attributes, which are not shown in FIG. 2. While datatypes provide definitions for the organization and structure of data objects, at run-time a software application or library can operate on data objects which are instances of associated datatypes. Thus, data object 215 is an instance of datatype 210, which can be formed of fields 220 holding respective child subtypes 230. The child objects 235 are instances of child subtypes 230, and members 225 are counterparts to fields 220, indicating the roles of the various child objects within a parent object 215. Depending on the context, it can be convenient to regard fields 220 and members 225 as being at the parent level, or at the child level. The dotted lines at the top and bottom of FIG. 2 indicate that the parent and child levels shown are merely exemplary, and a datatype or data object can extend to higher or lower levels. In this disclosure, fields 220 are labeled as being at the child level, due to the close binding between a field 220 and its associated child subtype 230. With this disclosure in hand, one of ordinary skill will recognize that alternative terminology can be commonly used in various application areas of the disclosed technology. For example, a datatype can be called a "class," and a data object can be called a "record" in certain applications.

The disclosed technologies are not limited to testing metadata combinations, but can also be applied to testing combinations of data values, or a mix of data and metadata values, of multi-level data objects. Likewise the disclosed technologies are not limited to testing user interfaces but can be applied to testing or validating any software functionality for multi-level datatypes or objects. The fields of complex datatypes are not restricted to holding data, but can also hold functions, much as C++ classes can have member data variables as well as member functions. These and many other variations are possible.

Terminology

The usage and meaning of all quoted terms in this section applies throughout this disclosure unless clearly indicated otherwise or repugnant to the context. The terminology below extends to related word forms.

A "software application" refers to a computer-executable program performing functions for one or more users, and can be distinct from an operating system, a software library, a test suite, or a development environment, any of which can provide environment, resources, or services for the software application.

An object or subtype is "accessible" if it can be accessed directly by a rule. This is similar to public designation of class members in C++, where a public member can be accessed directly, while a private member can only be accessed indirectly through any exposed interfaces of the class.

An "attribute" refers to a property or component of a datatype or data object that can take on one or more values. Setting an attribute means setting a value for the attribute. An attribute can be a data attribute of a data object, or a metadata attribute of either a datatype or a data object.

A "binary" attribute is one that can take either of two values. A Boolean attribute is a binary attribute that can take the values {True, False}. Other binary attributes can take values such as {0,1}, {True, False}, {On, Off}, {Yes, No}, or {X, not-X} for any X. Common metadata attributes can be Boolean.

"Call" refers to invocation of a function, such as a call from a software application to a function of a software library, or a call from a framework to a function of a software application. Usually, a call to a function is made from another software module, either within the software library or from the application. However, this is not a requirement, as a call can be recursive.

A "categorical" attribute or variable is one which takes a finite set of values (the categories). Usually the number of possible values is greater than two (to distinguish binary attributes) and small enough to be conveniently displayed in a list, often no more than 4, 8, 16, 32, 64, 128, or 256. That is, while common integer and floating point representations have a finite set of possible values owing to the bit precision of particular computing hardware, they can generally be regarded as having an infinite number of possible values for practical purposes, and are not considered categorical variables.

A "field" is a constituent part of a complex datatype. A field is considered to hold a subtype, which can either be a complex or simple datatype. A simple datatype has no fields. A field can have metadata attributes.

A "member" is a constituent part of a complex object. A member is considered to hold a child object, which can either be a complex or simple object. A simple object has no members. A member can have metadata attributes inherited from the field.

A "client" is a computer hardware or software entity that uses another computer hardware or software entity, as a resource or for a service. An application can be a client of a software library, hence the term client application. A computer or terminal can be a client device of the software library or of the application.

"Constant" refers to an attribute that has a unique value. Constant attributes can be disregarded while developing a set of coverage combinations. The unique value of a constant attribute can be applied at any point in the development of multi-level test datatypes or data objects according to the disclosed technologies.

"Coverage" refers to the extent to which a range of possible conditions or configurations can be evaluated by a software test. Full coverage indicates coverage greater than or equal to a predetermined threshold, which can be, in varying examples, at least 80%, at least 90%, at least 95%, at least 98%, at least 99%, at least 99.9%, or 100%, relative to a given range. To illustrate, a given test can provide 100% coverage of all pairs of attributes, and 60% coverage of all triples. This means that for every pair of attributes, all possible combinations of values for the pair occurs at least once. For example, for a pair of Boolean attributes, each of {TT, TF, FT, FF} can be found in the test. And, if there are T triples, with an average of C combinations each (e.g., a triple of binary attributes can have $C=2^3=8$ combinations), and accordingly a total of $C \times T$ triple combinations to test, then at least $0.6 \times C \times T$ of these combinations occur at least once in the test.

A "datatype" is a definition or specification of a type of data object. A datatype can be simple or primitive, meaning that it is not composed of smaller entities. Logical or Boolean variables, integers, and floating point variables are primitive datatypes in many computer languages. Likewise, many computer languages have either characters or strings as primitive datatypes. Complex datatypes can be composed of smaller entities, which can be simple datatypes or other complex datatypes. A complex datatype can be organized as a collection of fields, each field having a role within the complex datatype, and each field holding another datatype dubbed a "subtype". In the example of FIG. 1, the fields Country and Job Title both hold a string subtype, but have different roles as evident from their names. Thus, the field can have a set of metadata attributes according to its role, with the set of metadata attributes being independent of the attributes of the corresponding subtype it holds. The two fields Country and Job Title can have different metadata attributes even though they hold the same subtype (string). The term "datatype" can be used either generically or to indicate the type of an entire multi-level structure, whereas "subtype" is used specifically to indicate the type occupying a specific field at a specific level.

An "event" is a detected occurrence of a condition that can be used for signaling between modules or functions in a software environment. Events can be used to detect exceptions or for routine processes in a software environment. Commonly, an event handler responds to an event. A software module or object can be registered on the event, which means that the registered software module or object can be notified of the event's occurrence, e.g., by the event handler.

A "framework" is a kind of software library which provides a software development or execution environment to which additional custom or application-specific code can be added. Frameworks can be extensible. In some examples, an application built on a framework can have control flow with the framework calling application code, as compared to other architectures in which application code can call library functions.

"Hierarchical" refers to multi-level data structures (either types or objects) that are organized as a tree. That is, a hierarchical data structure has a root component, and every other component of the hierarchical data structure has a unique parent, which can ultimately be traced back to the root.

"Instance" refers to an object formed from a datatype.

An "interface" of a software library or other software program is a facility for interacting with the software library or program. Examples of interfaces include a graphical user interface (GUI) or application programming interface (API).

A "level" of a multi-level data structure is an indication of ordering between components of the data structure. In a hierarchical data structure, a root component can be described as being at level 1, with child, grand-child, etc. components being successively at levels 2, 3, etc.

A "library" refers to a computer-executable program performing functions for a software application or other software, and can be distinct from a software application, an operating system, or a development environment.

A "list" refers to an ordered or unordered finite collection of objects or values. Often, a list can be presented in a drop-down selection or other menu. A list does not require any particular organization as a data structure, although vectors and arrays can be commonly used.

A "menu" refers to a presentation of two or more choices on or by an interface. The interface can be a graphical user interface (GUI) and the menu can be visually presented on-screen, but this is not a requirement. An interface can be an application programming interface (API), and the menu can be presented by handshake, for example, in response to a query such as "help" or "what-are-the-choices-?"

"Metadata" refers to an attribute of a data object or datatype that indicates a property of the data object or datatype but is not stored within the data object.

A "multi-level" data structure (either a type or an object) is a data structure in which a component at one level can have zero or more child components on a lower level. Although some multi-level data structures are hierarchical, this is not a requirement. A multi-level data structure can have metadata attributes variously associated with components of the data structure or with links or relationships (such as fields) between the components. A multi-level data object can have data attributes associated with respective components of the data object.

"Mutable" refers to an object that can be modified, i.e. having one or more modifiable components. An object can be both mutable and read-only if the object as a whole cannot be over-written but, e.g., child objects can be modified. An object can be immutable and also have read-only=False, if the object and child objects cannot be changed, but the object as a whole can be replaced with another object of the same subtype. A child object can inherit immutability from a parent object. The immutable metadata attribute can be associated with a field of a given datatype indicating that the subtype held by that field can be instantiated as an immutable object.

An "object" is an instance of a datatype that occupies some memory at runtime and is directly or indirectly accessible to a software application. Common objects are data objects and contain data, however this is not a requirement.

A "pair" is a tuple of two attributes.

"Read-only" refers to an object of a multi-level data object that can be read but cannot be over-written. The read-only metadata attribute can be associated with a field of a given datatype indicating that the subtype held by that field can be instantiated as a read-only object.

A "redundant combination" of attribute values is a combination of values, for a given tuple of attributes, that occurs more than once.

"Root" refers to the topmost level of a multi-level datatype or multi-level data object.

A "rule" is an executable function that can apply its associated logic to an object of a software application. Common rules are of the form if-condition-then-action, however this is not a requirement. Rules can be invoked in response to an event, which can be the same as or distinct from the tested condition of the rule. The rule logic can be localized within a rules framework supporting the software application, localized within the software application, or distributed between them. Examples of rules include validation rules, which can show an error message if the object being tested is found to be invalid; propagation rules, which can populate some members of an object if the tested condition is true; event rules, which can trigger an event in response to the tested condition (the application or any of its modules or data objects can be registered to respond to such an event, possibly by invoking another rule); or decision rules, which can return True or False to indicate the status of the tested condition. Rules can apply to objects and members at any level of a multi-level data object. A condition on one member or object can result in an action on another object or member of the multi-level data object. A rule can be defined on a datatype and applied to a data object that is an instance of the datatype.

In the context of user interfaces or menus, "selection" refers to providing input to the interface based on items available on the interface or menu. A selection can be on a displayed list of items, on a drop-down list of items, on a radio button, on another control, or via a parameter in a call to an API. Selection can refer to either the act of providing input or the input provided. In other contexts, "selection" can refer to making a choice, as in selecting tuples of attributes for defining coverage requirements.

"Software" refers to computer-executable programs or instructions and associated data structures.

"Sparse" refers to a collection of items that has cardinality smaller, often much smaller, than the space of which the items are a part. The cardinality of a sparse collection can be less than or equal to half, one tenth, one percent, $10^{-3}$, or $10^{-6}$ of the cardinality of the space. A 10×10 matrix having 17 non-zero components is sparse, since 17 is less than half of 10×10=100. A set of 12 metadata combinations providing pairwise coverage over a space of $2^{35}$ ($\cong 3 \times 10^{10}$) possible combinations is sparse, since 12 is less than $10^{-6}$ of the size of the space.

"Structure" refers generically to either a datatype or an object. A test structure can be a test datatype or a test object. A multi-level structure can be either a multi-level object or a multi-level datatype.

A "subtree" of a given node of a tree includes all nodes whose parentage leads to the given node and excludes all other nodes. A subtree is a tree.

"Subtype" refers to the type of a single object at a particular level of a multi-level object, or equivalently the type held by a particular field of a multi-level datatype at a particular level.

"Test" refers to an action of verifying correct operation or correct configuration of a software program, a software library, a software interface, or another form of software. A test can include providing input to the software being tested, and verifying a response or a characteristic of a response from the software being tested.

A "test suite" is a collection of software programs and data (often including data for test stimulus and data for expected test response) for verifying correct operation of another software program, correct operation of a software interface, or a configuration thereof.

A "tree" is a data structure in which data components are nodes, one of which is a root node, and every other node of the tree has a unique parent node that can ultimately be traced back to the root node. A node which is not parent of another node (i.e. it has no child nodes) can be dubbed a leaf node.

"Trigger" refers to a software action happening in response to an event, a condition, or another software action. For example, a condition can occur, and an event can be raised in response, leading to execution of a software function. The software function can be said to be triggered by the condition or the event.

A "tuple" is an ordered grouping of attributes or other items. Common tuples include pairs (two items), triples (three items), N-tuples (N items). Because this disclosure is concerned with combinations of attributes, covering combinations of values of attribute pair (A,B) is the same as covering combinations of values of pair (B,A).

"Type" refers to datatype, and can formally describe data, functions, or other software entities.

"Validation" is a process of verifying correct operation of a software module. Because it is often impractical to verify correctness in all possible variations or situations, validation is often associated with a degree of confidence. For example, one study found that pairwise combinatorial testing found 86% of bugs in a large software application, with progressively higher confidence for triples, 4-tuples, and so on.

First Example Method

Figure 3:
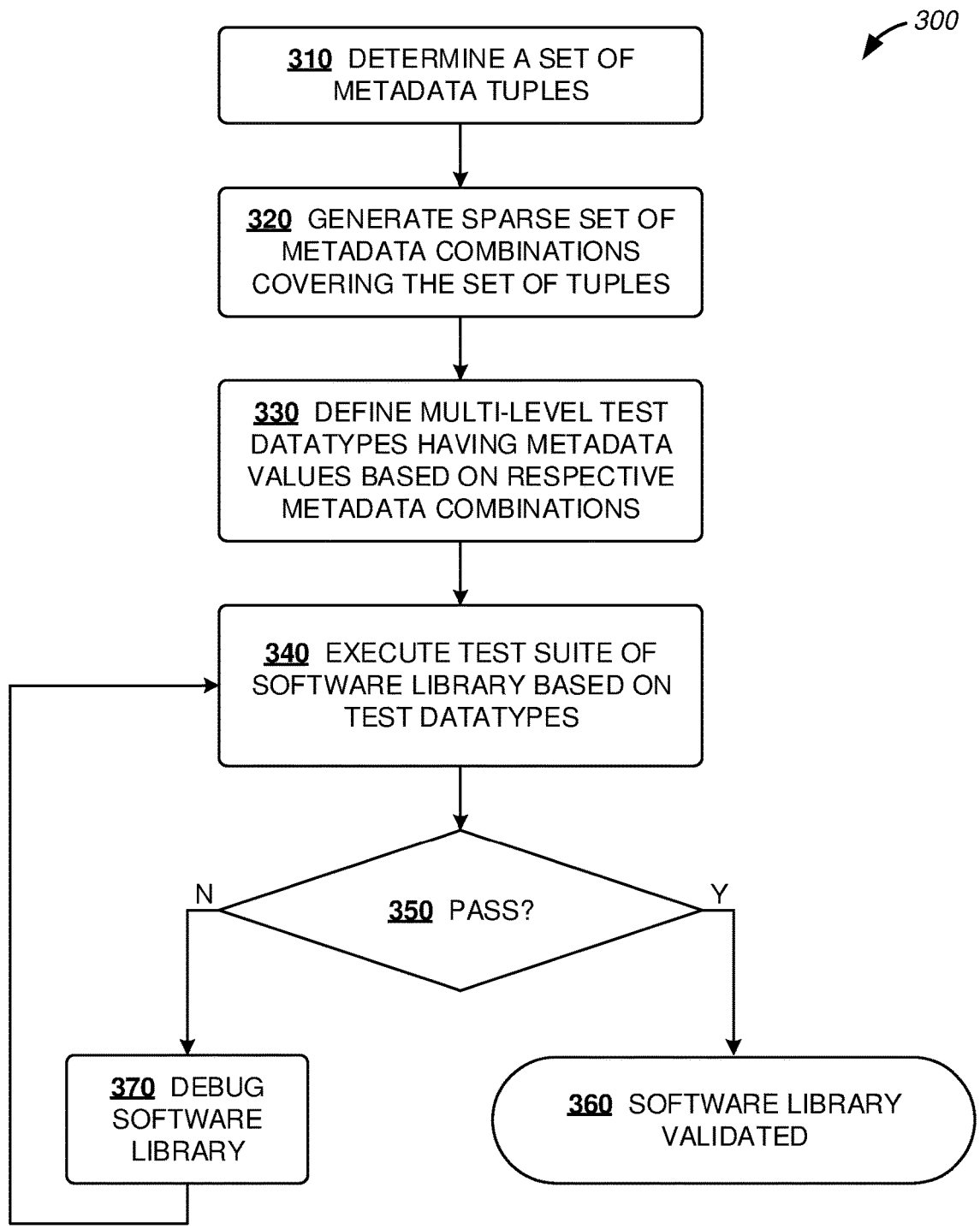
FIG. 3 is a flowchart depicting an example method according to disclosed technologies.

FIG. 3 is a flowchart 300 depicting an example method according to disclosed technologies. The method supports testing of a software library for multi-level datatypes having multiple linked levels with corresponding metadata attributes. Combinatorial testing can be used to develop a set of test datatypes providing coverage for permissible combinations of metadata tuples. The test datatypes can be used, either directly or indirectly, to validate the software library.

At process block 310 a set of metadata tuples is determined, combinations of which are to be covered by testing. The set of tuples can be determined by receiving a predetermined list or definition of the tuples to be covered, by enumeration of tuples (e.g. enumerating all pairs of metadata attributes), according to a specification provided by a user or client (e.g. a mix of certain pairs and other n-tuples), by excluding certain metadata attributes (e.g. those which are constant), or by excluding certain tuples (e.g. those which are mutually exclusive), in any combination.

At process block 320, a sparse set of metadata combinations can be generated. The sparse set can provide full coverage of the set of tuples of the metadata attributes of a multi-level datatype. The tuples can be pairs, however this is not a requirement: coverage can be provided for selected triples, quartets, or other N-tuples. Full coverage of a tuple, such as a pair, can mean that all combinations of the allowed values for an instant pair of attributes occurs at least once in the sparse set of metadata combinations. For example, a pair of binary attributes is covered if the pair value combinations {00, 01, 10, 11} each occur at least once in the sparse set. Given three binary attributes having permissible values {0, 1} {True (T), False (F)} and {Yes (Y), No (N)} respectively, the set of four combinations {0TY, 0FN, 1TN, 1FY} provides coverage of all pairs of the three attributes—e.g., the second and third attributes have four combinations {TY, TN, FY, FN} each of which occurs once in the set. Because the set has only four combinations while an exhaustive enumeration includes eight combinations (e.g., 0TN is not in the set), the set is sparse. Further, the set only provides coverage for pairs. 3-tuples (triples), are not covered: once again, 0TN is not in the set. This example uses binary attributes, however that is not a requirement: ternary, categorical, or other attributes can be used.

Figure 7A:
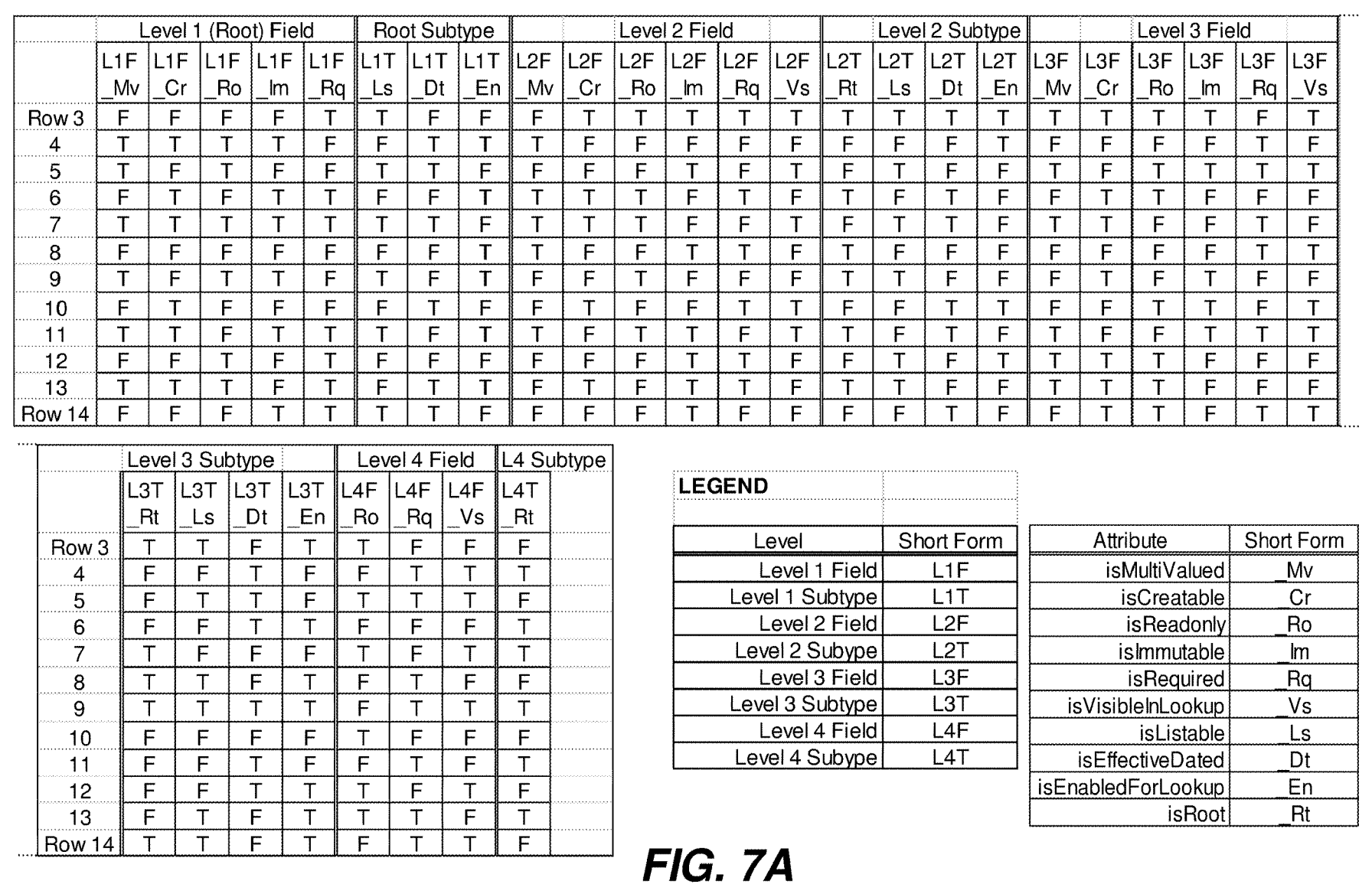

At process block 330, multi-level test datatypes can be defined. The metadata attribute values of the test datatypes can be set according to the various metadata combinations in the sparse set. FIG. 7A, described further herein, shows a sparse set of metadata combinations arranged as a table, with each row representing one combination, and the columns representing respective attributes. In some examples, the test datatypes attribute values are a 1:1 match with respective rows of the table, however this is not a requirement. As described herein, a single row can spawn multiple test datatypes, or a single test datatype can have attributes obtained from more than one row. In further examples, multi-level test datatypes can be restricted to a preset maximum number of levels.

At process block 340, a test suite is executed on the software library, to verify correct operation of one or more functions of the software library, for the multi-level test datatypes. If responses to test stimuli of the test suite match expected responses, then the software library can be said to pass the test suite. Such a determination can be made at decision block 350. If the software library passes the test suite, the method follows the Y branch to 360, and the software library can be regarded as validated. If the software library does not pass the test suite, the method follows branch N to process block 370 for debugging, following which the method can return to process block 340 for further test. Debugging can include, without limitation, code review, code execution in a debugger, unit test, profiling, or analysis of a log file, control flow, or a memory dump.

Attribute Dependency

In some examples, attributes can have dependencies. As an illustration, attributes A and B can be mutually exclusive, meaning that both cannot be True. That is, among the pair-wise combinations of A, B, only {TF, FT, FF} are possible. This situation can be handled in different ways. As a first option, all possibilities {TT, TF, FT, FF} can be considered for the purpose of testing, with a predetermined expected behavior for the impossible TT case. As another option, a synthetic composite attribute "AB" can be implemented as a categorical variable having three possible values {TF, FT, FF}, in lieu of the original attributes A and B.

First Example System and Environment

Figure 4:
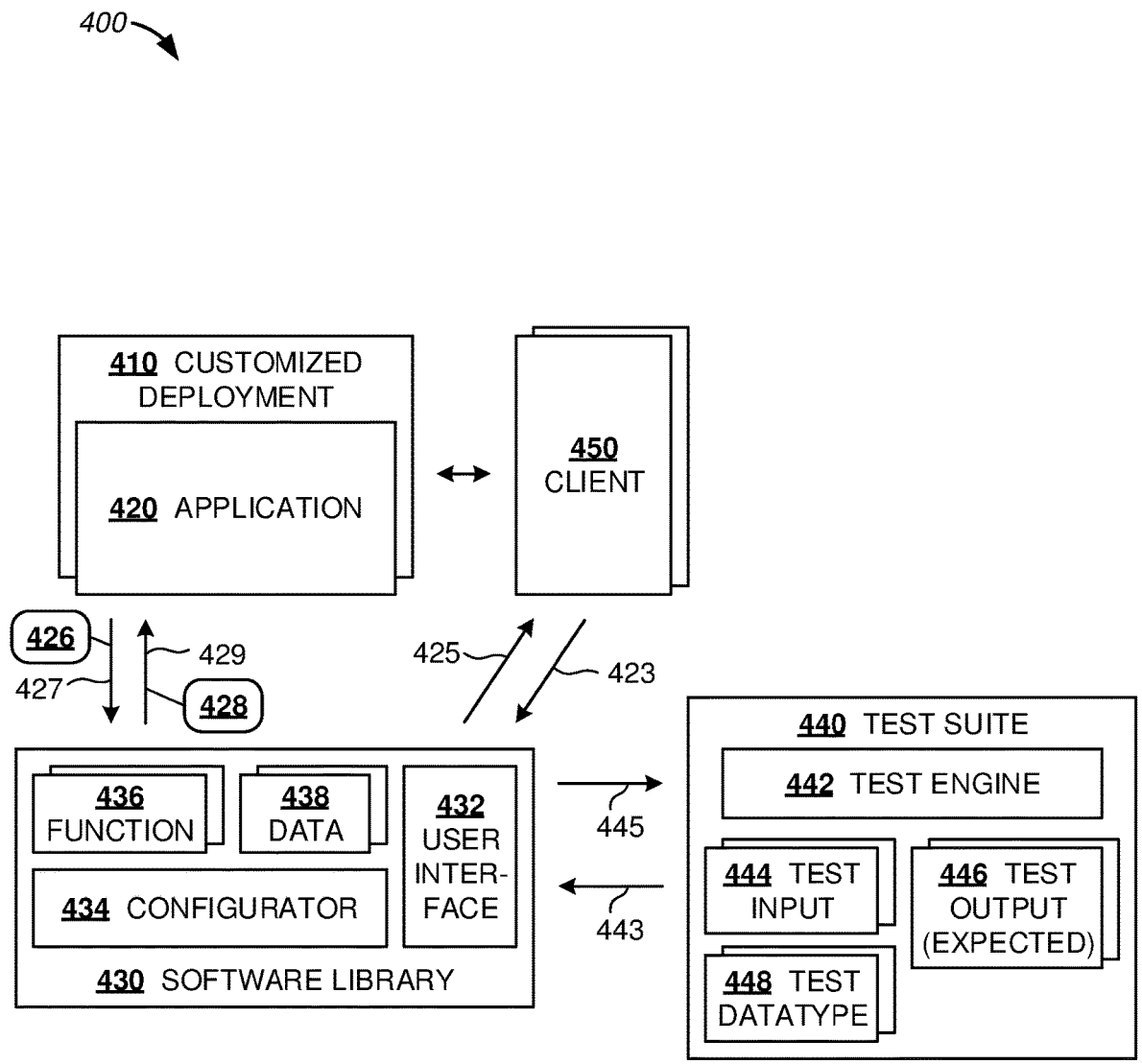
FIG. 4 is a block diagram of an example system and environment according to disclosed technologies.

FIG. 4 is a block diagram of an example system and environment 400 according to disclosed technologies. A software library 430 can be a resource for an application 420. A test suite 440 can be used to validate the software library 430. Application 420 can be customized in its deployment 410, and a client device 450 can use or interact with the customized deployment 410 of application 420, thereby invoking functions of the software library 430.

For purpose of illustration, a rules framework will be described for software library 430 which, however, is not so limited. The rules framework can include a user interface 432, which can be used at a first runtime to configure rules for the customized deployment 410 of application 420. A user at client 450 can interact directly or indirectly with user interface 432, providing inputs 423 and receiving responses 425 in response. For example, input 423 can be a menu selection, a navigation control, or a field entry on a graphical user interface 432, and response 425 can be a navigation response with updated display on the graphical user interface 432. Additionally, the user inputs 423 can cause configurator 434 to variously configure the rules of the customized deployment 410. Rules can be created, configured, updated, or removed. The rules can be implemented with functions 436 and/or data 438.

At a second runtime, as the application 420 interacts with clients 450, the application 420 can make use of the configured rules. Effectively, a rule is applied to an application object, and can be triggered by an event. For the Job Information example of FIG. 1, setting Job Title to Engineer (an event) can set the list of available Country values (an action). At arrow 427, the software library 430 is called upon to execute a rule, and at arrow 429, the result or action 428 of the rule is conveyed back to the application 420. The details of implementation can vary considerably. In some examples, data 426 is passed to the software library representing or identifying at least some of an event, a rule, and/or an application object to which the rule is to be applied. In further examples, the software library 430 can provide a plug-in to the application 420, or the application 420 can provide a plug-in to the rules framework 430. In this way a relatively lightweight customized application 410, 420 can make use of a relatively extensive set of executable code in the library 430 for implementing rules.

Test suite 440 can be provided to test and validate portions of software library 430 such as interface 432. The test suite 440 incorporates test datatypes 448 developed as described herein to provide combinational coverage of different configurations of application datatypes. Test suite 440 also incorporates test inputs 444, and expected test outputs 446. Test inputs 444 can be in common for all of the test datatypes 448, or can be partially or entirely customized for each respective test datatype 448. Expected test outputs 446 can be distinct for each respective test datatype, although they can be compressed in view of commonality in the expected outputs. Test engine 442 can provide input 443 from test inputs 444 to the user interface 432, and can obtain responses 445 from the user interface 432. By comparing responses 445 with expected test output 446, test engine 442 can make a determination whether the user interface passes the test suite, as described in context of decision block 350. Testing can be performed during development, prior to deployment and any runtime, or testing can be performed during the lifecycle of library 430, as updates are made to the library 430, the application 420, or other aspects of the environment.

Generally, application 420 implements multi-level objects that are instances of one or more multi-level datatypes. The test datatypes 448 correspond to multi-level datatypes used by application 420. Thus, software library 430 can include a user interface 432 and execution of test suite 440 can include verification of menus or selections of the user interface 432 for one or more multi-level test datatypes 448. Execution of the test suite 440 can include comparing output of the user interface 432 with target output 446 for one or more multi-level test datatypes 448. In some examples, the software library 430 can incorporate a rules framework, the multi-level datatypes can define data structures used in an application 420, and the rules framework can incorporate a calling interface 432 accessible to users of the application 420 at client devices 450. The rules framework 430 can also be accessible to the application 420.

Many variations are possible. A software library such as a rules engine can export an application programming interface (API) or user interface (UI) for use by a host software application or clients thereof. All or part of a software application can be provided as a plug-in to a framework such as a rules framework. Tests can pass or fail based on a variety of factors, including content of a response, time or size of a response, or whether or not a response is generated. These and other variations are all within the scope of the disclosed technologies.

Second Example Method

Figures 5A, 5B:
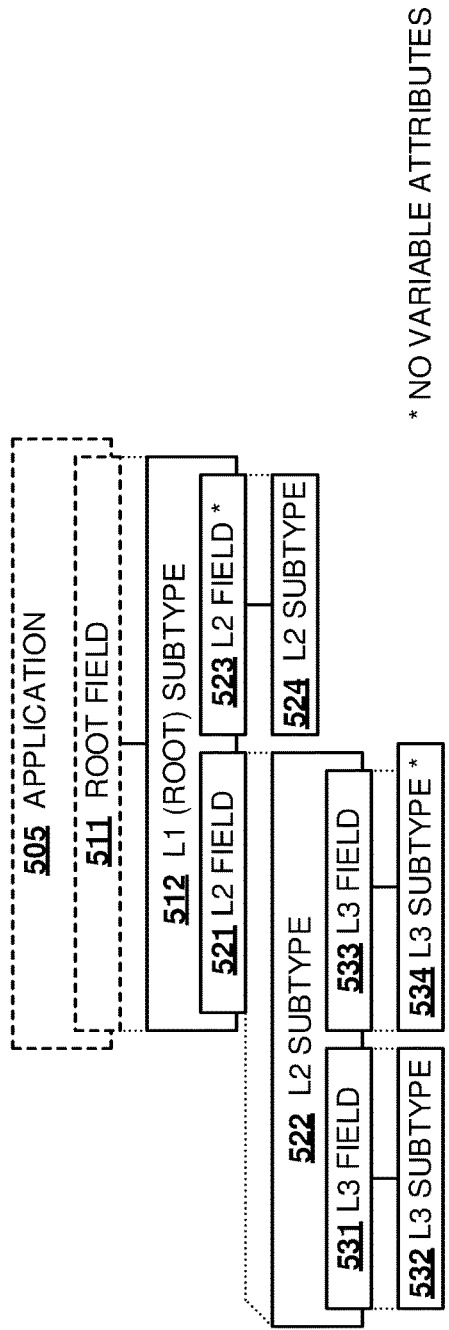
FIGS. 5A-5B are illustrations of a second example of a hierarchical datatype with example testing coverage according to the disclosed technologies.

FIG. 5A illustrates a second example of a hierarchical datatype 500 used by an application 505. Datatype 500 has a root 512. Because instances of datatype 500 have an associated role within application 505, datatype 500 or its root 512 can be considered to occupy a field 511 of application 505. Application 505 and field 511 are not part of datatype 500 (and hence are shown with a dashed line), rather they are included in FIG. 5A to illustrate the relationship between datatype 500 and application 505.

As illustrated, datatype 500 is a multi-level datatype with multiple subtypes at respective levels. In this example, root subtype 512 at level 1 (denoted L1 in FIG. 5A) has two fields 521, 523 at level 2 (L2). Field 523 holds a primitive subtype 524 that has no further fields of its own. Field 521 holds a complex subtype 522, which has fields 531, 533 at level 3 (L3). In this example, fields 531, 533 holds simple subtypes 532, 534 respectively. Subtypes 524, 532, 534 have no fields or child subtypes, and are leaf nodes of hierarchical datatype 500. The illustrated multi-level datatype 500 is hierarchical, and includes a hierarchy of subtypes at respective levels, with each subtype below a root level occupying a field of a parent subtype.

It can be convenient to distinguish child subtypes from root subtype to keep track of attributes that belong to level 2 from attributes belonging to level 1, and so forth, even though all the subtypes shown are part of datatype 500. In some examples, a root subtype 512 can fully determine the structure of datatype 500, but in other examples, the structure can be variable. For example, a field for Household Pet can hold a subtype for Dog or Bird, which can be complex subtypes with different attributes and subtrees.

It can also be convenient to distinguish attributes of a field, based on the role of the field, from attributes of the subtype held by the field. In the example of FIG. 1, Country and Job Title can have different metadata attributes, even though each holds a string subtype. For example, Country can be constant, while Job Title can be list-selectable.

FIG. 5B illustrates a tabular view 501 of datatype 500, arranged to illustrate an example of combinational coverage according to the disclosed technologies. Constituent parts of datatype 500 (subtypes and fields) are organized in a first row of FIG. 5B. The respective attributes 541-568 of these subtypes and fields are shown directly below in a second row, and the possible values 571-598 of these attributes are shown in the bottom row. Thus, the metadata attributes of datatype 500 are variously associated with the various subtypes and fields of datatype 500. As an example, root subtype 512 has two attributes 543, 544, each of which is Boolean with values T (True) or F (False) respectively shown at 573, 574. Field 533 has four attributes 565-568, each of which is Boolean with T/F values 595-598. While many attributes can be binary, this is not a requirement. Attribute 555 is categorical, having four possible values 585 A, B, C, or D.

In FIG. 5B, root field 511 can be included, so as to provide test coverage of multi-level datatype 500 in different scenarios with varying values of root field attributes 541, 542. Meanwhile, field 523 and subtype 534 can be omitted from FIG. 5B if they have no variable attributes, as indicated by a * in FIG. 5A.

Using a combinatorial testing approach, examples of the disclosed technology determine a set of metadata value combinations providing coverage for predetermined tuples of metadata attributes. FIG. 5B provides an illustration of how coverage requirements can specify the tuples for which test coverage can be provided. Example coverage requirements are shown at the top of FIG. 5B.

First, 2-way coverage can be required across all attributes depicted, meaning that for every pair of attributes, all combinations of possible values can occur at least once within a combinatorial covering set. For 542 and 562, all possibilities TT, TF, FT, FF can occur at least once. For 568 and 555, all possibilities, TA, TB, TC, TD, FA, FB, FC, FD can occur at least once within the combinatorial covering set. And similarly for other pairs of depicted attributes.

Additionally, 3-way coverage can be required for all triples formed of one attribute from field 521, one attribute from subtype 522, and one attribute from field 531. There are eight such triples, {551 553 561} and so forth. The 3-way coverage requirement means that, for each qualifying triple, all combinations (e.g., TTT, TTF, TFT, . . . FFF) must occur at least once within the combinatorial covering set.

Still further, this example shows 4-way coverage required among the attributes of field 533. All sixteen combinations of possible values (e.g., TTTT, TTTF, TTFT, . . . FFFF) of attributes 565-568 must occur once within the combinatorial covering set.

This example illustrates just a few coverage requirements. Many similar coverage requirements, in any combination, can be used in examples of the disclosed technology. Tuples can be pairs, triples, or any N-way grouping of attributes. Having selected the tuples for combinatorial testing, a wide range of commercial, free, or open-source tools are available for generation of a combinatorial covering set. A website http://www.pairwise.org/tools.asp provides a non-exhaustive list of such tools.

Example Metadata Attributes

In a multi-level datatype, metadata attributes can be associated with a subtype or with a field holding that subtype. One exemplary subtype attribute is IsRoot (or "Rt" for short), a Boolean attribute indicating whether the subtype can occur at a root level (Rt=True) or not (Rt=False). A subtype having Rt=True can be promoted, along with its subtree, to a datatype distinct from its parent. In some examples, a subtype with IsRoot attribute can correspond to an independently instantiable datatype, such as tDepartment in the example of FIG. 1.

Another subtype attribute can be IsListable (or "Ls" for short), a Boolean attribute indicating whether a list of possible data values can be formed for the subtype (Ls=True), or not (Ls=False). In the example of FIG. 1, a string subtype of a Country field could be selectable from three possible values and could accordingly have Ls=True. Some subtypes can have different respective values for different time slices and are dubbed EffectiveDated ("Dt" for short). A further example of a subtype metadata attribute, IsEnabledForLookup (En for short), can indicate whether the subtype is accessible to one or more functions of a software application or library. A subtype with En=True could be used as a target for a rule of a rule engine. Another possible subtype metadata attribute, HasFields ("Fi" for short), can indicate whether the subtype has fields. In examples, Fi=True corresponds to a complex subtype, while Fi=False corresponds to a simple subtype which can be a leaf subtype of a multi-level datatype. These examples of subtype metadata attributes are provided for illustration and are not limiting. Embodiments of the disclosed technology can have more, less, the same, or different subtype metadata attributes.

Certain field metadata attributes are also described herein. Attribute IsMultiValued ("Mv" for short) can indicate whether a field can have multiple values within its parent subtype, that is, whether the parent subtype can have multiple copies of the given field. For example, a Project Team can have fields for Manager and for Worker. The Manager field can have My=False, indicating that a Project Team can have only one Manager, while the Worker field can have My=True, indicating that the Project Team can have multiple Workers. Attribute IsCreatable ("Cr" for short) can indicate whether a create operation can be applied to the field. Attribute IsReadOnly ("Ro" for short) can indicate whether the field is read-only (Ro=True) or can be written to (Ro=False). Attribute IsImmutable ("Im" for short) can indicate whether the field is immutable. Attribute IsRequired ("Rq" for short) can indicate whether the field is required to be present (Rq=True) or can be omitted or left empty (Rq=False). Attribute IsVisibleInLookup ("Vs" for short) can indicate whether a field can be accessed by a function of a software application or library. A field with Vs=True could be used in a condition within a rule of a rule engine. These examples of field metadata attributes are provided for illustration and are not limiting. Embodiments of the disclosed technology can have more, less, the same, or different field metadata attributes.

Third Example Method

Figure 6:
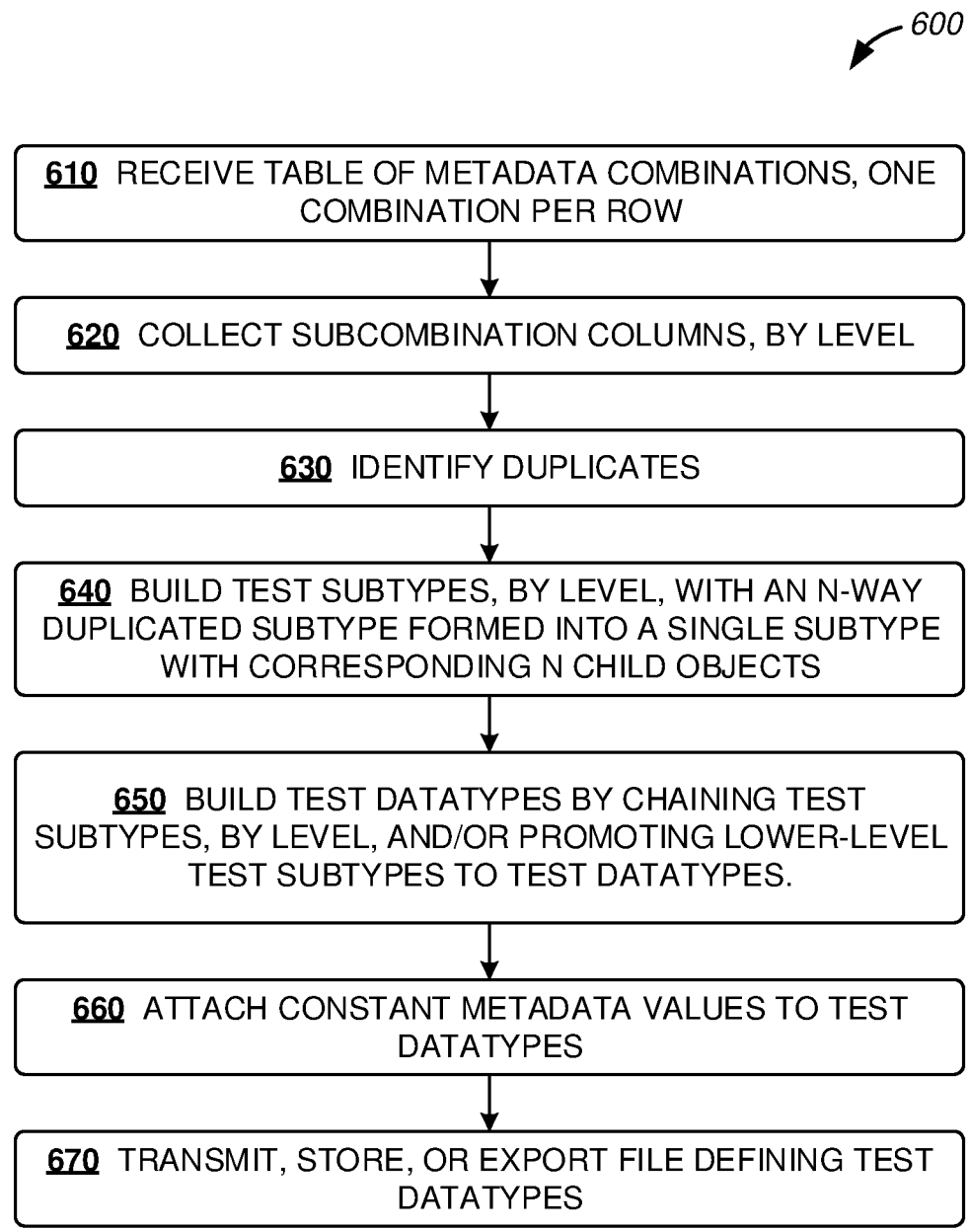
FIG. 6 is a flowchart depicting a second example method according to disclosed technologies.

FIG. 6 is a flowchart 600 depicting a second example method according to disclosed technologies. The second method is described with the aid of an illustrative example shown in FIGS. 7A-7H. The method of FIG. 6 begins with a set of metadata combinations, which can provide coverage of combinations of metadata values for selected tuples of metadata attributes of a multi-level datatype. Through described processes, multi-level test datatypes are derived for this set of metadata combinations and suitably outputted.

At process block 610, the metadata combinations (e.g., a combinatorial coverage set) are received. The metadata combinations can be organized as a table, with one metadata combination in each row, and metadata attributes organized in respective columns. FIG. 7A illustrates an example. Rows 3-14 respectively define 12 metadata combinations. Row 2 identifies the attributes in each column, the attributes being associated with field or subtype as indicated in Row 1. The attributes for the level 2 subtype include Rt, Ls, Dt, and En. The Rt attribute can be omitted for level 1 because level 1 is the root level, for which Rt is necessarily True and is therefore a constant attribute as described herein.

In the example of FIG. 7A, a multi-level datatype is formulated with each subtype having a single field, at each level. This can provide a compact test formulation, with less columns and therefore less combinations (i.e. less rows) required for coverage. Insofar as the behavior being tested (e.g. a user interface for a rules framework) depends on the attributes and attribute combinations, and not on the specific fields and subtypes, test coverage of the multi-level datatype can be maintained at a considerable simplification. This simplification can be achieved because attributes can be specified in a generic manner, e.g. attribute isReadOnly can be applicable to any field, or attribute isRoot can be applicable to any subtype, rather than having attributes that are specific to one or a few fields or subtypes.

However, such a formulation is not a requirement. FIG. 5B shows an example where a table of attributes is organized preserving multiple fields 531, 533 of subtype 522.

Furthermore, in FIG. 7A, attributes are shown separately for a given field (e.g. Level 2 Field) and for the subtype (e.g. Level 2 Subtype) occupying that field. This separation between attributes can be made according to whether the attribute properly belongs to the subtype (e.g. a string) occupying the field, or to the role of the field (e.g. a name) within a parent subtype. By separating attributes between field and associated subtype, and incorporating an isRoot attribute, multi-level test datatypes rooted at different levels can be efficiently generated in a single procedure. Thus, the separation between field attributes and subtype attributes provides an improvement over an approach in which the field and associated subtype are treated together as a single node of a multi-level datatype. This separation, together with the isRoot attribute, solves a technical problem of needing to generate multi-level test data structures separately for embedded data structures present within a larger parent data structure. To illustrate, with reference to FIG. 1, a multi-level test data structure for subtype tDepartment can be generated as part of generating a multi-level test data structure for datatype Job Information, without requiring a test structure generation procedure to be repeated.

Furthermore, the integrated generation of multi-level subtypes rooted at different levels (e.g. 772-776 in FIG. 7G) facilitates testing across attributes of an embedded structure combined with attributes of its parent structure, rather than only testing the embedded structure as a stand-alone structure in isolation.

Then, at process block 620, the sub-combinations are collected for each level. FIGS. 7B-7D provide an illustration. For convenience of illustration, FIG. 7B shows the attribute values for each subtype or field grouped into readable names. Thus, in row 3, the L1 subtype (LIT) has attribute IsListable (Ls)=True, while the attributes EffectiveDated (Dt) and EnabledForLookup (En) are false, and a readable name L1T_Ls can be formed indicating that only the IsListable attribute is True. Other rows have names such as L1T_En, L1T_LsDt (two attributes True) or LIT_ (no attributes True). Similarly, among the L1 field attributes in row 3, only IsRequired (Rq) is True. The readable name for the L1 field can inherit the attributes of its immediate subtype; thus, the name L1F_LsRq can be obtained instead of merely L1F_Rq. The other rows are similar. In FIG. 7C, the readable names can be grouped first as field, subtype for each level. The columns for individual attributes can be omitted because the equivalent information is captured in the readable names. In FIG. 7D, further grouping as a triad (parent subtype, field, child subtype) can be performed. Certain duplicates can be observed, for example, rows 6 and 8 both have LIT En.

At process block 630, these duplicates can be identified. Correspondingly, FIG. 7E shows the rows sorted by level 1 subtype (LIT . . . ) readable name, and grouped according to distinct values of the corresponding metadata attributes. The other levels are similar. Bullets are used to indicate rows whose parent subtype has a redundant combination of metadata attributes relative to the row above.

At process block 640, test subtypes can be built for each level. A row having no redundancy can be formed into a single linear test subtype having metadata values for parent subtype, field, and child subtype as indicated on the corresponding row. However, an L1_Type name that is duplicated N times over N rows can be consolidated into a single test subtype having N fields and respectively N child subtypes, according to the N rows. Thus, defining a test subtype can include identifying a given subtype among the metadata combinations which has redundant combinations of type metadata attributes, and merging respective subtrees of the redundant combinations as multiple fields of the given subtype. Correspondingly, FIG. 7F illustrates test subtypes derived from FIG. 7E. Multi-row test subtypes are indicated with a dashed outline. Thus, for parent subtypes at Level 1, rows 4, 6, 5, and 9 are multi-row test subtypes having merged subtrees of multiple level 2 fields. The other rows 12, 10, and 3 are ordinary single-row subtypes.

This procedure of combining multiple subtypes leads to fewer multi-level test structures and, accordingly, more efficient testing for any given degree of tuple-wise test coverage. Additionally, combination of redundant subtypes can lead to parent types having multiple child fields and subtypes, even when the original coverage of tuples (as in the example of FIG. 7A) is formulated as a single child subtype at each level, thus providing improved testing coverage of additional failure scenarios.

Figure 7G:
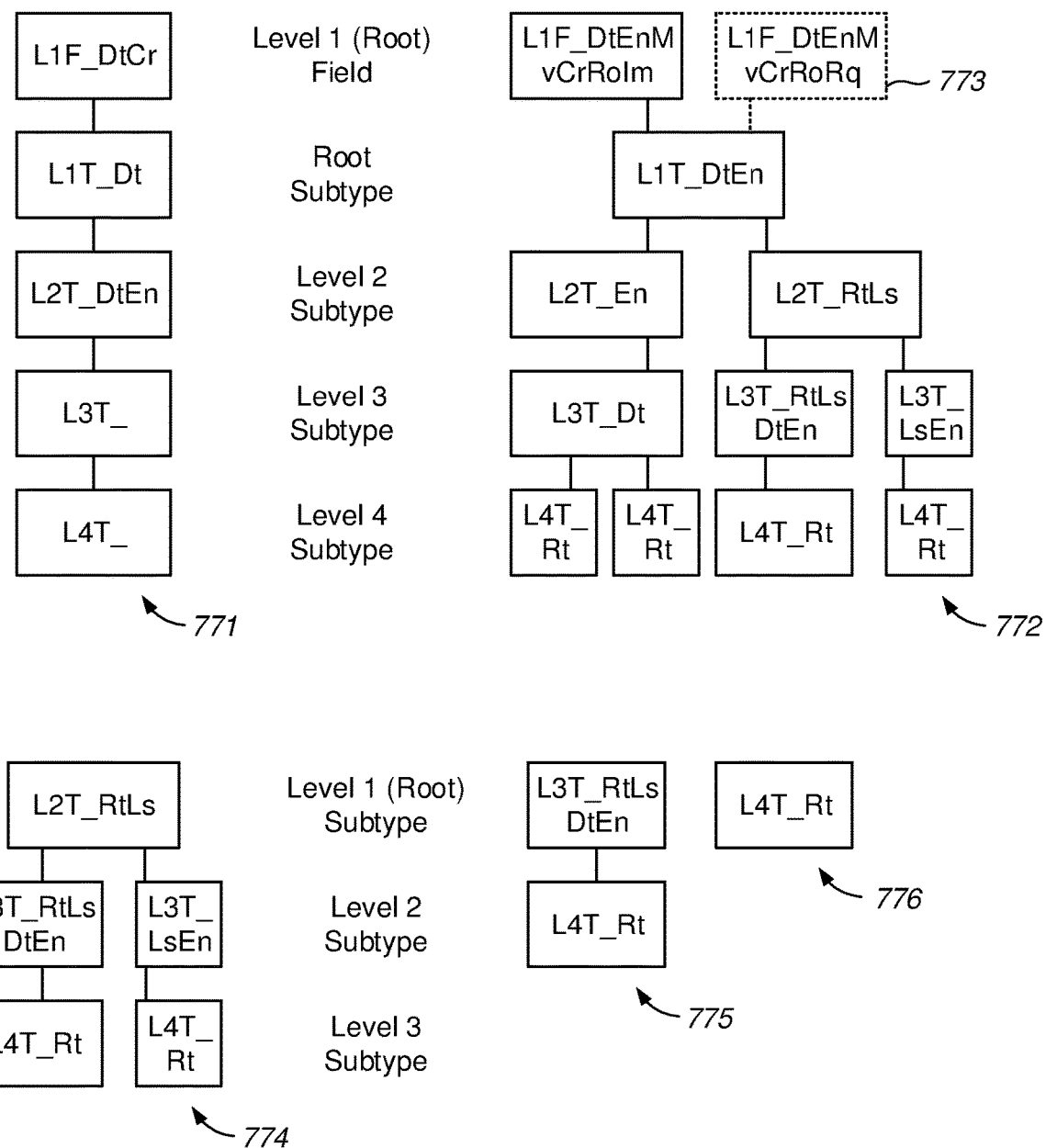

At process block 650, multi-level test datatypes can be defined from the test subtypes. In a first way, test subtypes can be chained together. For example, a test subtype having child subtype L2T_X can be joined with another subtype having parent subtype L2T_X. The test subtypes can be chained in this way to reach from Level 1 to any leaf subtypes, and can also optionally be joined to a root field by matching the Level 1 subtype in FIG. 7B. Alternatively, chaining can be restricted to a preset maximum number of levels to limit testing complexity. FIG. 7G shows examples of such multi-level test datatypes 771, 772. Multi-level test datatype 771 is an unbranched datatype from Row 10 of FIG. 7F. Multi-level test datatype 772 corresponds to the parent subtype at Level 1 in FIG. 7F, with extensions to corresponding matching rows from Level 2 to Level 3, and Level 3 to Level 4. Multi-level test datatype 772 is shown with a root field (solid line) from Row 4 of FIG. 7B. However, L1T_DtEn is also matched by row 13, and multi-level test datatype 772 can also be collected with the root field 773 from row 13, as shown by dotted outline in FIG. 7G. In some examples, where more than one possible root field matches a given Level 1 subtype, distinct multi-level test datatypes can be built with each root field.

Additionally, a subtype occurring at a level below the root level among the metadata combinations can also be promoted to the root level. That is, a test datatype can be formed by promoting a lower level test subtype having a parent subtype attribute Root=True to be a root subtype, with lower level subtypes chained as needed to complete the datatype. Thus, through promotion, an L2-L3 test subtype can form a new datatype having new levels 1-3 corresponding to old levels 2-4. Test datatypes 774-776 are such examples. Because the Level 2 test subtype L2T_RtLs has a root attribute=True, it can be promoted to Level 1 along with any lower level test subtypes to which it is chained. Similarly, test subtypes L3T_RtLsDtEn (FIG. 7F row 9) and L4T_Rt (FIG. 7F row 4) can be promoted to form test datatypes 775, 776 respectively. Test datatype 776 has only a single level.

Then, at process block 660, constant metadata values can be set for one or more of the multi-level test datatypes to complete their definition. (These constant metadata attributes can be omitted while selecting tuples for combinational coverage, as described in context of FIG. 5B.) Finally, at process block 670, a file defining the test datatypes can be outputted, by transmission over a network to a computing node hosting a test suite such as 440, by storage to a non-transitory storage medium, or by exporting the file to the test suite. FIG. 7H shows an example of a JSON file portion 780 corresponding to Level 1 subtype L1T_LsDt 781 from row 5 of FIG. 7F. This subtype has Ls, Dt, and Rt all True, and En=False. (Rt is a constant attribute at level 1, always True, hence can be omitted from the level 1 subtype attributes in FIG. 7B, while Rt is not constant and can be retained at levels 2-4.) By merging redundant combinations, this level 1 subtype can have three fields (see FIG. 7F) with level 2 field (L2F) attributes L2F_LsImVs 782 (of which the Ls attribute is inherited from level 2 subtype L2T_Ls 783), L2F_LsDtMvCrRoVs 784 (of which the LsDt attributes are inherited from level 2 subtype L2T_LsDt 785), and L2F_DtIm 786 (of which the Dt attribute is inherited from level 2 subtype L2T_Dt 787).

Fourth Example Method

Figure 8:
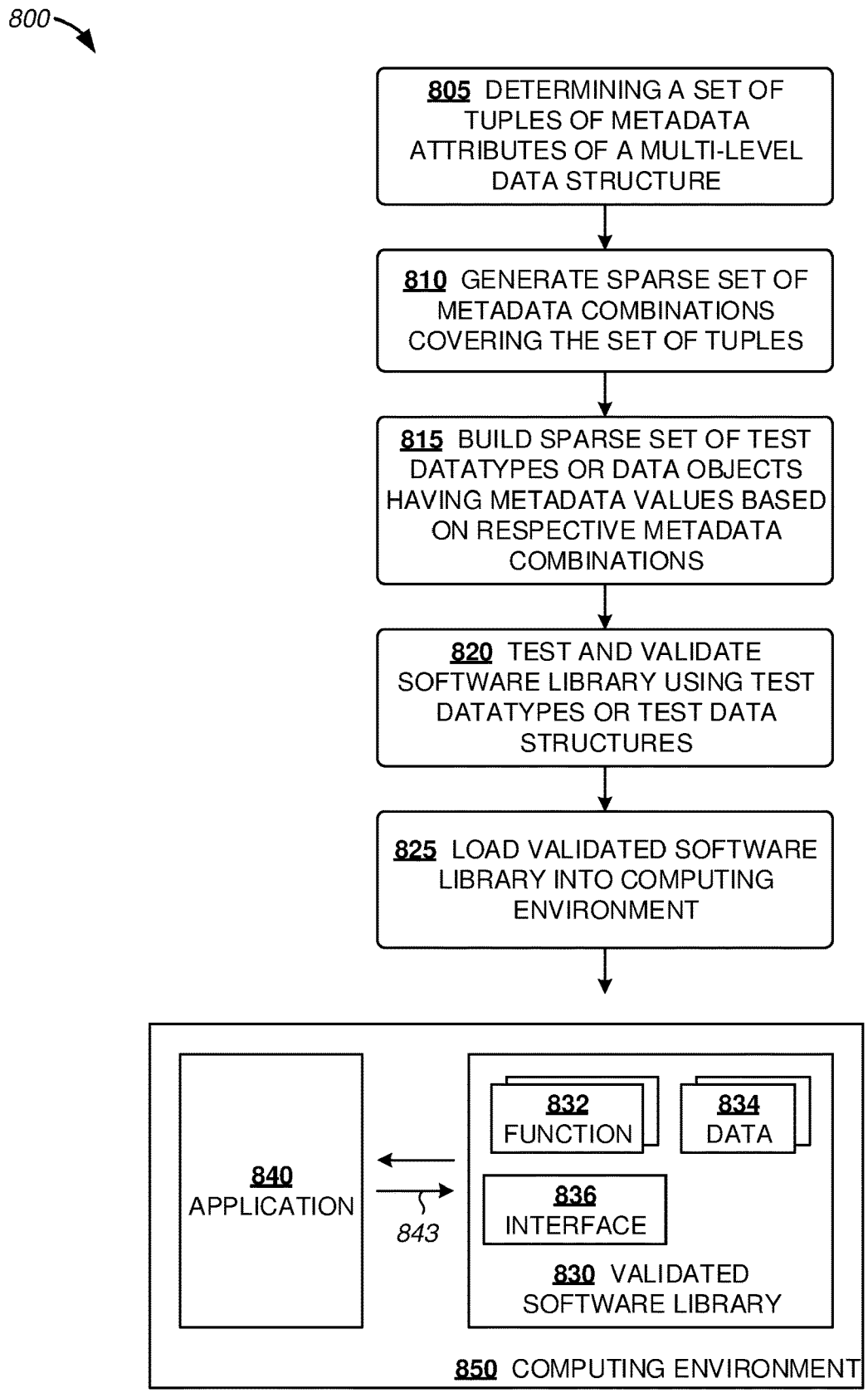
FIG. 8 is a diagram illustrating example interaction between an application and a validated software library, according to the disclosed technology.

FIG. 8 is a hybrid diagram 800 illustrating an example interaction between an application 840 and a validated software library 830, according to the disclosed technology. Validated software library 830 provides a resource to application 840 for multi-level datatypes and/or data objects used by application 840. The multi-level data objects can be instances of the multi-level datatypes; the objects or datatypes can have a plurality of linked levels with corresponding metadata attributes. Generally, validated software library 840 can include one or more functions 832 and/or stored data 834. For example, library 830 can include a rules engine implementing rules for the multi-level data objects or an interface for configuring such rules in accord with specified behavior of the application 840.

Arrow 843 represents making a call to a function in validated software library 830, and another arrow shows a corresponding response. As illustrated, software library 830 can be validated using the disclosed technologies. A set of metadata attribute tuples, to be covered by testing is determined at process block 805, as described herein. At process block 810, a sparse set of metadata combinations can be generated, which can provide full coverage of the set of tuples of the metadata attributes corresponding to the levels of an instant multi-level datatype. At process block 815, multi-level test data structures can be built, with test metadata attributes set according to the generated metadata combinations. In some examples, the test data structures can be multi-level test datatypes, while in other examples the test data structures can be multi-level test data objects which are instances of the multi-level test datatypes. At process block 820, a test suite for the software library 830 can be executed, based on the multi-level test data structures (datatypes or data objects), leading to validation of the software library 830 if the test suite results are successful. At process block 825, the validated software library can be loaded into a computing environment 850 shared with client application 840.

In some examples, the call 843 to a function 832 of software library 830 causes a rule of client application 840 to be configured. As illustrated, call 843 can be triggered from the client application 840, however this is not a requirement. In other examples, library 830 can expose an interface 836, and a call to function 832 can be triggered from the interface 836, such as a user input on a graphical user interface, or by invocation of an exposed method of an application programming interface (API) of the library 830.

Fifth Example Method

Some examples above describe using multi-level test datatypes to test functionality of a software library such as a rules engine. Some functionality, such as a user interface, can be satisfactorily tested directly using the definitions of datatypes. In other examples, a data object of an executable program can be passed to or made available to the software library to be operated on by a function of the software library. In such examples, the multi-level test datatypes can be instantiated as multi-level objects for testing. It can be desirable to test combinations of object data values as an alternative to or in addition to combinations of metadata values. Having built multi-level objects, operation of software library functions can be verified using these multi-level objects.

Figure 9:
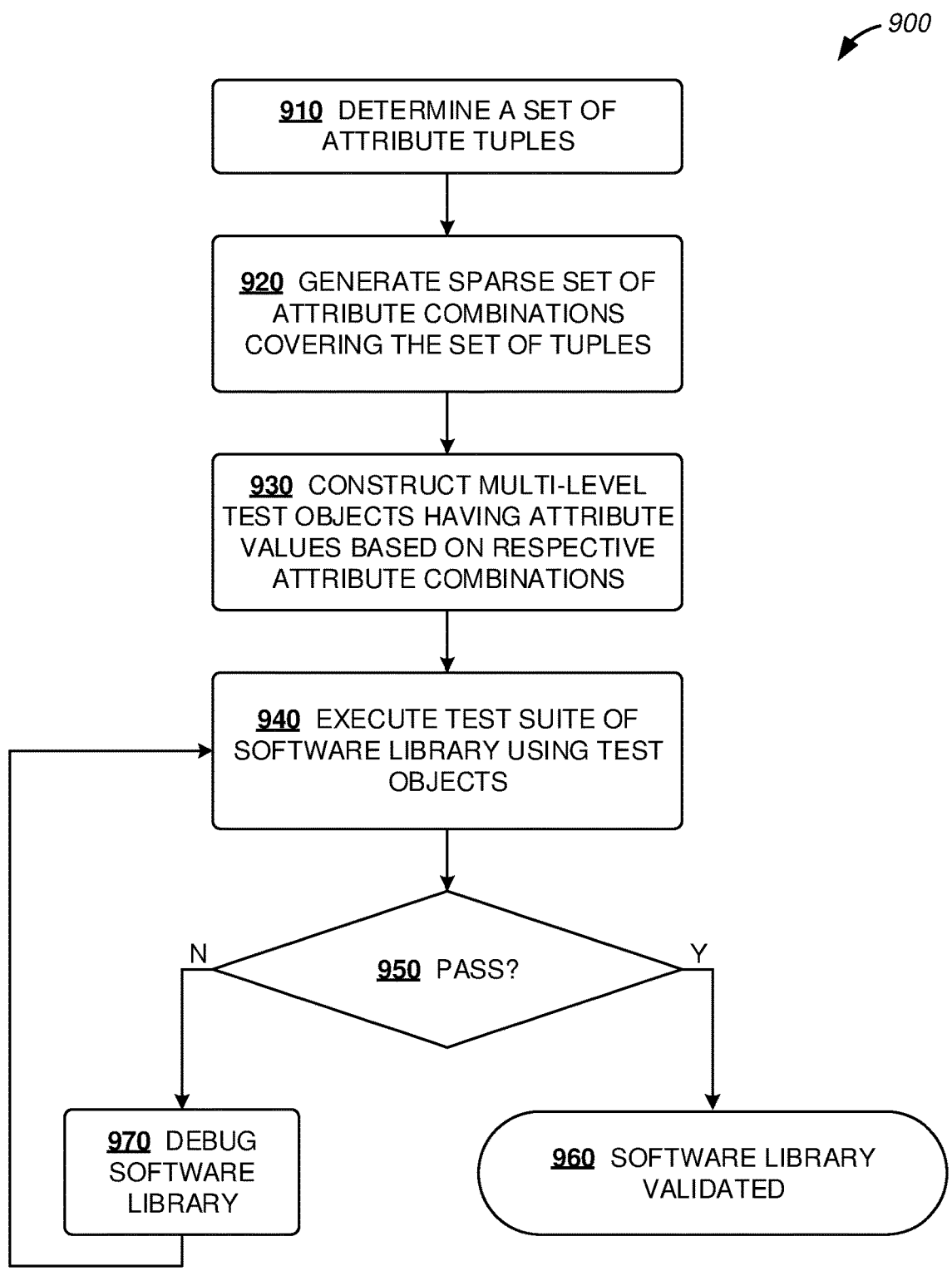
FIG. 9 is a flowchart depicting a third example method according to the disclosed technologies.

FIG. 9 is a flowchart 900 depicting a third example method according to the disclosed technologies, for testing with data objects. At process block 910 a set of attribute tuples can be determined, combinations of which are to be covered by testing. The attributes can be metadata attributes, inherited from the datatype of which the data object is an instance, or they can be data attributes. The tuples can be pairs or other N-tuples. The set of tuples can be determined by receiving a predetermined list or definition of the tuples to be covered, by enumeration of tuples (e.g. enumerating all pairs of attributes), according to a specification provided by a user or client (e.g. a mix of certain pairs and other n-tuples), by excluding certain attributes (e.g. those which are constant), or by excluding certain tuples (e.g. those which are mutually exclusive), in any combination. At process block 920, a sparse set of attribute combinations can be generated. The sparse set can provide full coverage of the set of tuples of the attributes of a multi-level data object. At process block 930, multi-level test objects can be constructed having attribute values based on respective attribute combinations of the set generated at 920. In some examples, all attributes can be metadata attributes, and multi-level test objects can be constructed by building multi-level test datatypes as described in context of FIG. 6, and instantiating the datatypes as respective multi-level test objects. At process block 940, the constructed test objects are used by a test suite for testing a software library. The test suite can verify operation of one or more functions of the software library acting on the multi-level test objects, which can be instances of the multi-level datatypes.

If the test suite is found to pass at decision block 950, the method follows the Y branch and terminates at block 960 with a determination that the software library has been validated. Alternatively, if the test suite fails, the method follows the N branch of decision block 950 to process block 970 for debugging the software library, and then returns to process block 940 for further test.

Attributes, particularly data attributes, can have many possible data values. To render combinatorial testing feasible where the range of possible values is large, or nearly infinite, the range of possible attribute values can be covered by a finite set of representative values. For example, representative values for a 16-bit unsigned integer can be taken in a geometric progression, such as {46341, 23171, 11586, 5793, 2897, 1449, 725, 363, 182, 91, 46, 23, 12, 6, 3, 2, 1} which is a geometric progression to within rounding. The representative values covering a large range can also be guided by the usage of an instant attribute, and need not be uniform. Representative values for an integer denoting number of children in a family could be {0, 1, 2, 5, 23}.

Second Example System and Environment

Figure 10:
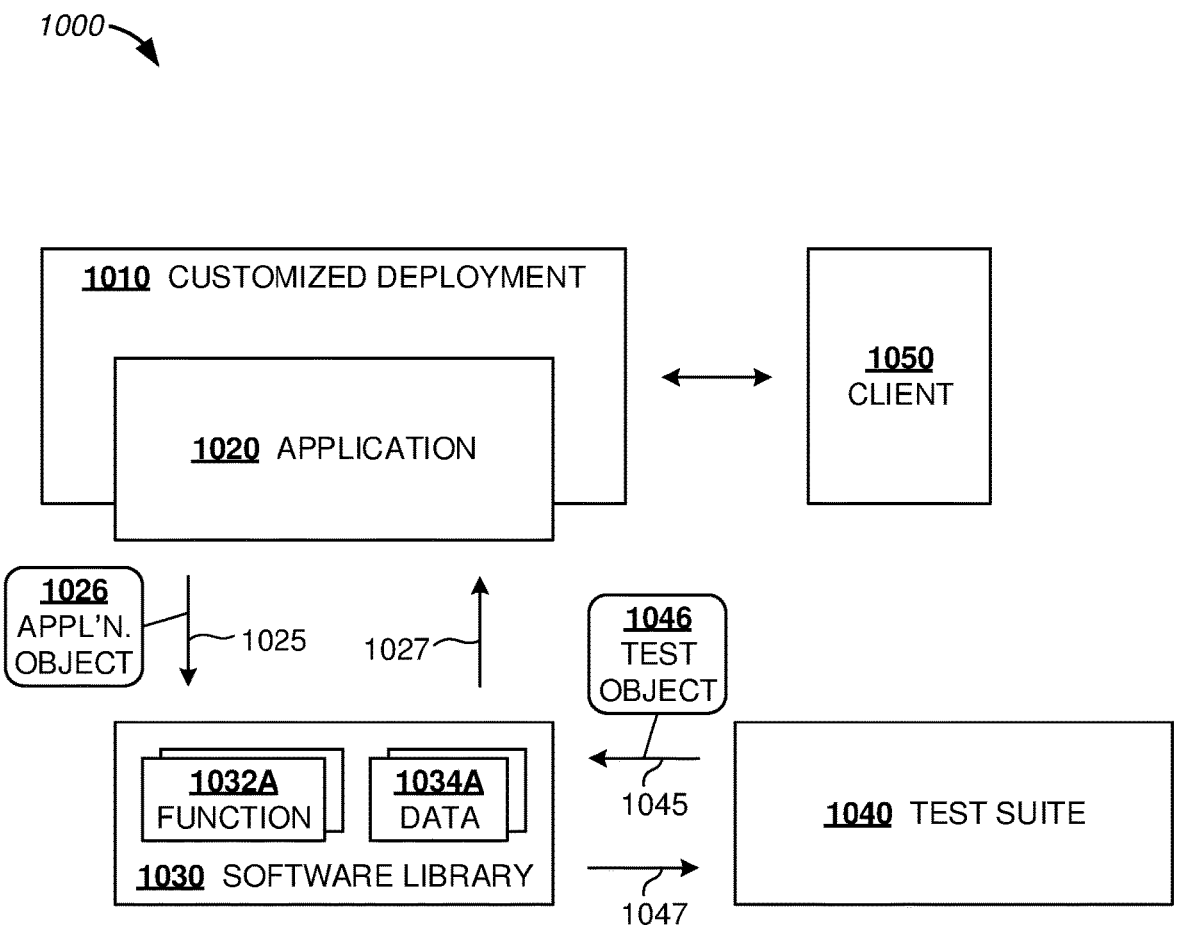
FIG. 10 is a block diagram of a second example system and environment according to disclosed technologies.

FIG. 10 is a block diagram of a second example system and environment 1000 according to disclosed technologies. A software library 1030 can be a resource for an application 1020. A test suite 1040 can be used to validate the software library 1030. Application 1020 can be customized in its deployment 1010, and a client device 1050 can use or interact with the customized deployment 1010 of application 1020, thereby invoking functions of the software library 1030.

At runtime, as the application 1020 interacts with clients 1050, the application 1020 can call one or more functions 1032 to act on one or more application objects 1026. A call 1025 can provide either an application object 1026 or an identifier of such object to function 1032. At arrow 1027, the software library 1030 can provide a response back to the application 1020.

At testing time, test suite 1040 can perform stimulus-response testing of the library 1030. Stimulus is provided at 1045, where a multi-level test object 1046, or an identification thereof, can be passed to the library 1030, and a corresponding response is received at 1047. If the response to a single test matches an expected response, the test passes. If all tests in test suite 1040 pass, then the software library 1030 can be determined to be validated.

A Generalized Computer Environment

Figure 11:
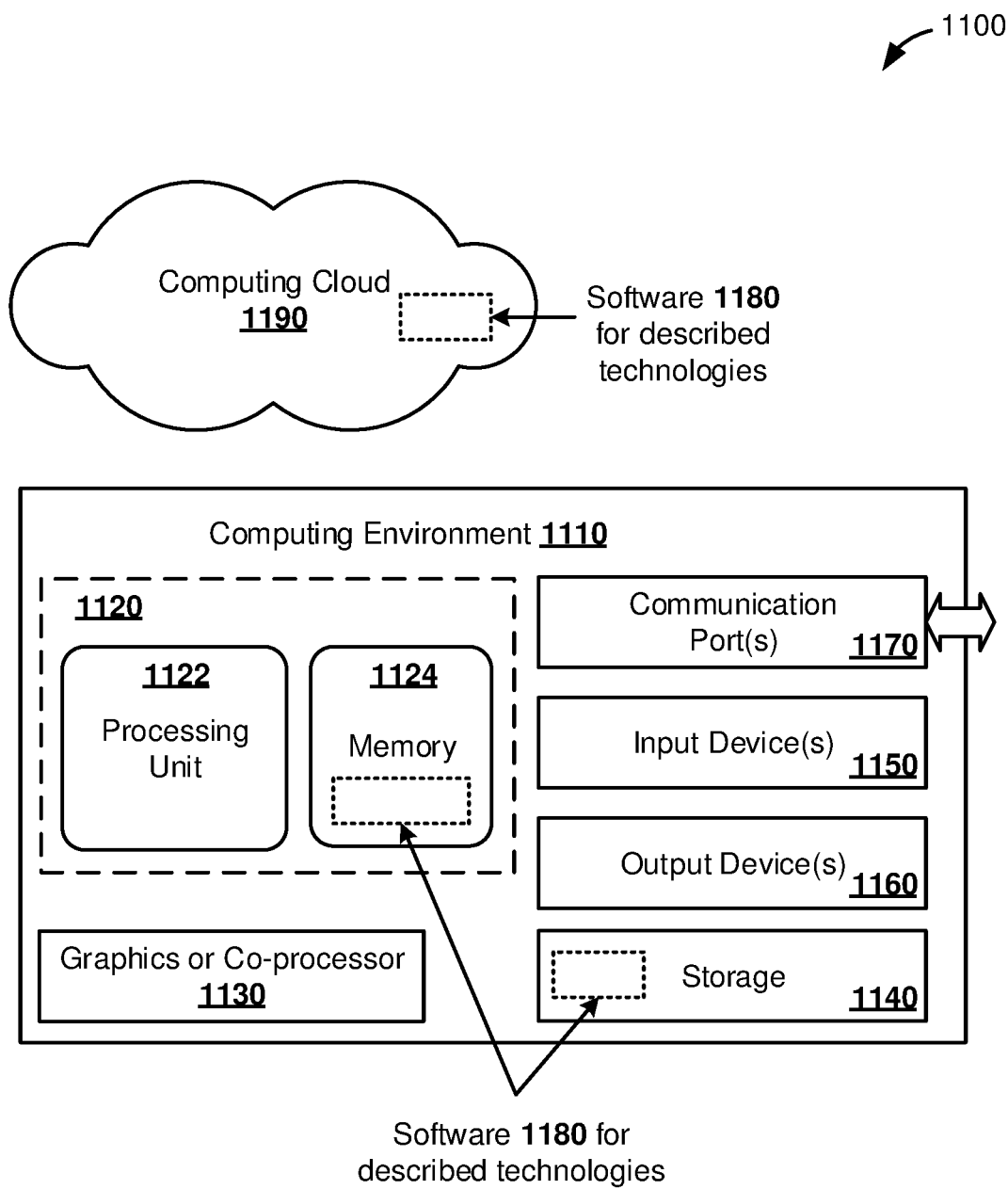
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of a database acceleration system can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for traversing or enumerating one or more tree structures, for synthesizing tree nodes, for detecting structural errors such as recursion in a tree, for importing nodes from a referenced child tree into a primary tree, or various other architectures, components, handlers, managers, modules, and repositories described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store configuration data, tree structure information, tables including structure tables, data tables, working tables, change logs, output structures, input vectors, output vectors, indices, or flags, as well as other configuration and operational data.

A computing system 1110 can have additional features, such as one or more of storage 1140, input devices 1150, output devices 1160, or communication ports 1170. An interconnection mechanism (not shown) such as a bus, controller, or network interconnects the components of the computing environment 1110. Typically, operating system software (not shown) provides an operating environment for other software executing in the computing environment 1110, and coordinates activities of the components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technology are executed. Any combination of memory 1124, storage 1140, and computing cloud 1190 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware.

Example Cloud Computing Environment

Figure 12:
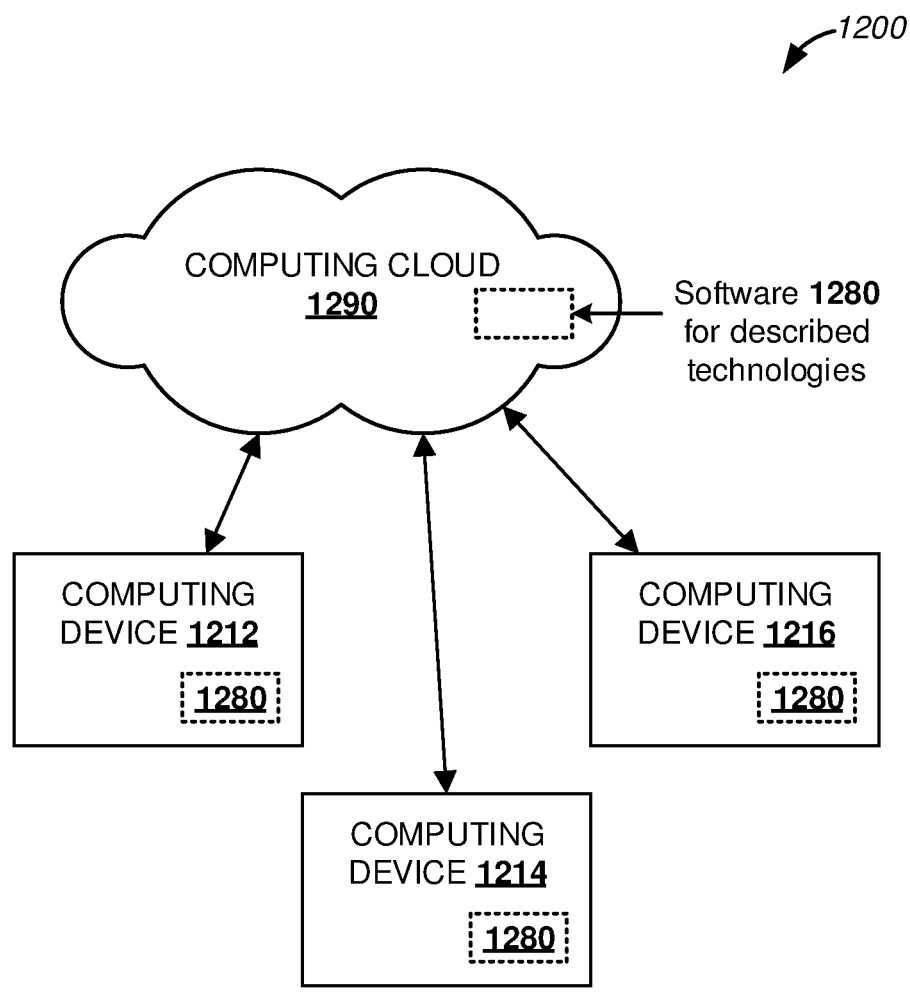
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., server, virtual machine, embedded systems, desktop, or laptop computers), mobile devices (e.g., tablet computers, smartphones, or wearable appliances), or other types of computing devices. Connections between computing cloud 1290 and computing devices 1212, 1214, and 1216 can be over wired, wireless, or optical links, or any combination thereof, and can be short-lived or long-lasting. These connections can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

GENERAL CONSIDERATIONS

As used in this disclosure, the singular forms "a," "an," and "the" include the plural forms unless the context clearly dictates otherwise. Additionally, the terms "includes" and "incorporates" mean "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "apply," "build," "call," "collect," "compare," "configure," "cover," "create," "define," "determine," "execute," "form," "generate," "identify," "link," "list," "merge," "modify," "mutate," "occupy," "overwrite," "pass," "process," "promote," "provide," "remove," "respond," "set," "test," "update," "use," "validate," "verify" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The term computer-readable storage media does not include signals and carrier waves. In addition, the term computer-readable storage media does not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of testing a software library for multi-level datatypes having a plurality of linked levels with corresponding metadata attributes, the method comprising:
    determining a set of tuples of the corresponding metadata attributes of the multi-level datatypes handled by the software library;
    generating a sparse set of metadata combinations providing full coverage of the set of tuples;
    defining multi-level test datatypes having a test metadata attributes set according to the generated sparse set of metadata combinations and defining data structures of the software library,
    wherein the defining comprises:
        identifying a first given subtype among the metadata combinations having redundant combinations of type metadata attributes, and merging respective subtrees of the redundant combinations as multiple fields of the first given subtype, or
        promoting, to a root level, a second given subtype occurring at a level below the root level in a given one of the multi-level test datatypes; and
    validating the software library by executing a test suite for the software library, the test suite being based at least in part on the multi-level test datatypes.

2. The method of claim 1, wherein at least one of the corresponding metadata attributes is a binary attribute.

3. The method of claim 1, wherein at least one of the tuples is a pair.

4. The method of claim 1, wherein at least one of the tuples comprises three or more of the corresponding metadata attributes.

5. The method of claim 1, wherein the software library comprises a rules framework and the rules framework comprises a calling interface accessible to users of the application.

6. The method of claim 1, wherein the software library comprises a user interface and the executing the test suite comprises verifying menus or selections of the user interface for one or more of the multi-level test datatypes.

7. The method of claim 1, wherein a given datatype of the multi-level datatypes has a plurality of subtypes at respective levels, and at least a third given subtype of the subtypes has one or more of the type metadata attributes among the corresponding metadata attributes.

8. The method of claim 7, wherein the type metadata attributes are one or more of: an attribute indicating whether the third given subtype can occur at a root level of a corresponding datatype, an attribute indicating whether a list of possible data values can be formed for the third given subtype, an attribute indicating whether the third given subtype can have time slices, an attribute indicating whether the third given subtype is accessible to one or more functions of the software library, or an attribute indicating whether the third given subtype has fields.

9. The method of claim 1, wherein a given datatype of the multi-level datatypes has a plurality of subtypes at respective levels, and at least a given one of the subtypes has a field having one or more field metadata attributes among the corresponding metadata attributes.

10. The method of claim 9, wherein the field metadata attributes are one or more of: an attribute indicating whether the Field can have multiple values, an attribute indicating whether a data value of the field can be modified, an attribute indicating whether the field is mutable, an attribute indicating whether the data value for the field must be defined, or an attribute indicating whether the field is accessible to one or more functions of the software library.

11. The method of claim 1, wherein the tuples exclude one or more constant attributes of the corresponding metadata attributes, and the defining multi-level test datatypes comprises setting the constant attributes in the multi-level test datatypes.

12. The method of claim 1, wherein the validating comprises:
building respective instances of the multi-level test datatypes; and
verifying operation of one or more functions of the software library acting on the built instances.

13. One or more non-transitory computer-readable media storing instructions which, when executed by one or more hardware processors, cause the one or more hardware processors to perform operations comprising:
determining a set of tuples of metadata attributes of multi-level datatypes handled by a software library;
generating a sparse set of metadata combinations providing full coverage of the set of tuples;
defining multi-level test datatypes having a test metadata attributes set according to the generated sparse set of metadata combinations and defining data structures of the software library,
wherein the defining comprises:
identifying a first given subtype among the metadata combinations having redundant combinations of type metadata attributes, and merging respective subtrees of the redundant combinations as multiple fields of the first given subtype, or
promoting, to a root level, a second given subtype occurring at a level below the root level in a given one of the multi-level test datatypes; and
validating the software library by executing a test suite for the software library, the test suite being based at least in part on the multi-level test datatypes.

14. The computer-readable media of claim 13, wherein the software library comprises a rules framework accessible to an application.

15. The computer-readable media of claim 13, wherein the software library comprises a user interface and the executing the test suite comprises comparing output of the user interface with target output, for one or more of the multi-level test datatypes.

16. The computer-readable media of claim 13, wherein a given one of the multi-level datatypes comprises a hierarchy of subtypes at respective levels, with each subtype below a root level occupying a field of a parent subtype of the subtypes.

17. A method of configuring a client application, the method comprising:
loading a validated software library for multi-level datatypes having a plurality of linked levels with corresponding metadata attributes, the software library having been validated by:
determining a set of tuples of the corresponding metadata attributes of multi-level datatypes handled by a software library;
generating a sparse set of metadata combinations providing full coverage of the set of tuples;
defining multi-level test datatypes having a test metadata attributes set according to the generated sparse set of metadata combinations and defining data structures of the software library,
wherein the defining comprises:
identifying a first given subtype among the metadata combinations having redundant combinations of type metadata attributes, and merging respective subtrees of the redundant combinations as multiple fields of the first given subtype, or
promoting, to a root level, a second given subtype occurring at a level below the root level in a given one of the multi-level test datatypes; and
validating the software library by executing a test suite for the software library, the test suite being based at least in part on the multi-level test datatypes; and
making a call to a function in the validated software library.

18. The method of claim 17, wherein the call to the function causes a rule of a client application of the validated software library to be configured.

* * * * *